(12) United States Patent
Sun et al.

(10) Patent No.: US 12,041,610 B2
(45) Date of Patent: Jul. 16, 2024

(54) TECHNIQUES FOR PDSCH/PUSCH PROCESSING FOR MULTI-TRP

(71) Applicant: APPLE INC., Cupertino, CA (US)

(72) Inventors: Haitong Sun, Cupertino, CA (US); Yushu Zhang, Beijing (CN); Chunhai Yao, Beijing (CN); Chunxuan Ye, San Diego, CA (US); Dawei Zhang, Cupertino, CA (US); Hong He, Cupertino, CA (US); Jia Tang, Cupertino, CA (US); Jie Cui, Cupertino, CA (US); Oghenekome Oteri, San Diego, CA (US); Sigen Ye, Cupertino, CA (US); Wei Zeng, Cupertino, CA (US); Wei Zhang, Cupertino, CA (US); Weidong Yang, San Diego, CA (US); Yang Tang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 322 days.

(21) Appl. No.: 17/593,738

(22) PCT Filed: Apr. 14, 2021

(86) PCT No.: PCT/CN2021/087255
§ 371 (c)(1),
(2) Date: Sep. 23, 2021

(87) PCT Pub. No.: WO2022/028002
PCT Pub. Date: Feb. 10, 2022

(65) Prior Publication Data
US 2022/0330296 A1  Oct. 13, 2022

(30) Foreign Application Priority Data
Aug. 6, 2020 (WO) ............... PCT/CN2020/107491

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1812* (2013.01); *H04L 5/0053* (2013.01);
(Continued)

(58) Field of Classification Search
CPC ......... H04W 72/1273; H04W 72/0446; H04W 72/0453; H04W 72/23
See application file for complete search history.

(56) References Cited

U.S. PATENT DOCUMENTS

| 2018/0019843 A1* | 1/2018 | Papasakellariou | .... H04L 1/1854 |
| 2019/0052406 A1* | 2/2019 | Yang | ...................... H04L 1/1819 |

(Continued)

FOREIGN PATENT DOCUMENTS

| CN | 110881220 A | 3/2020 | |
| WO | WO-2019158820 A1 * | 8/2019 | ........... H04L 1/1854 |

(Continued)

OTHER PUBLICATIONS

"The 5G Evolution: 3GPP Releases 16-17", 2020, 54 Pages.
(Continued)

*Primary Examiner* — Mohammad S Anwar
(74) *Attorney, Agent, or Firm* — Dorsey & Whitney LLP

(57) ABSTRACT

Techniques for physical downlink shared channel (PDSCH) and physical uplink shared channel (PUSCH) processing for multiple transmission and reception point (multi-TRP) are disclosed. In some embodiments, determining PDSCH hybrid automatic repeat request-acknowledgement (HARQ-ACK) processing timing may include determining that a user equipment (UE) is configured for single downlink control information (single-DCI) multi-TRP PDSCH opera-
(Continued)

tion, determining a first PDSCH and a second PDSCH within a slot, wherein the first PDSCH and the second PDSCH are used in the single-DCI multi-TRP PDSCH operation, and determining a minimum HARQ-ACK processing timing for the first PDSCH and the second PDSCH using one or more symbols of the first PDSCH or one or more symbols of both the first PDSCH and the second PDSCH.

20 Claims, 10 Drawing Sheets

(51) Int. Cl.
  *H04L 5/00*    (2006.01)
  *H04W 72/0446*  (2023.01)
  *H04W 72/0453*  (2023.01)
  *H04W 72/23*   (2023.01)

(52) U.S. Cl.
  CPC ... *H04W 72/0446* (2013.01); *H04W 72/0453* (2013.01); *H04W 72/23* (2023.01)

(56) References Cited

U.S. PATENT DOCUMENTS

| | | | |
|---|---|---|---|
| 2021/0227564 A1* | 7/2021 | Khoshnevisan | H04W 72/53 |
| 2021/0352629 A1* | 11/2021 | Haghighat | H04L 1/1896 |

FOREIGN PATENT DOCUMENTS

| | | | | |
|---|---|---|---|---|
| WO | 2019212628 A1 | | 11/2019 | |
| WO | WO-2019212628 A1 | * | 11/2019 | ........... H04L 1/0073 |
| WO | WO-2019214740 A1 | * | 11/2019 | ........... H04L 5/0007 |
| WO | 2020033884 A1 | | 2/2020 | |
| WO | WO-2020033884 A1 | * | 2/2020 | ........... H04L 1/0025 |
| WO | 2020076938 A1 | | 4/2020 | |

OTHER PUBLICATIONS

Ericsson , "Remaining issues on Multi-TRP/Panel Transmission", R1-2002472, 3GPP TSG-RAN WG1 Meeting #100bis-e, e-Meeting, Agenda Item 7.2.6.2, Apr. 20-30, 2020, 22 pages.
PCT/CN2021/087255 , International Search Report and Written Opinion, Jun. 24, 2021, 9 pages.
Huawei, HiSilicon, "Remaining issues on multi-TRP in R16", R1-2000204, 3GPP TSG RAN WG1 Meeting #100-e, Agenda Item 7.2.6.2, Feb. 24-Mar. 6, 2020, 5 pages.
Qualcomm Incorporated, "Multi-TRP Enhancements", R1-2004463, 3GPP TSG RAN WG1 #101-e, Agenda Item 7.2.6.2, May 25-Jun. 5, 2020, 11 pages.

* cited by examiner

TECHNIQUES FOR PDSCH/PUSCH PROCESSING FOR MULTI-TRP

TECHNICAL FIELD

This application relates generally to wireless communication systems.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz. Frequency Range 2 (FR2) includes frequency bands from 24.25 GHz to 52.6 GHz. Bands in the millimeter wave (mmWave) range of FR2 have shorter range but higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Multiple transmission and reception point (multi-TRP) is one of the five agendas in Rel-16 eMIMO. Two modes of operation have been agreed for multi-TRP in NR Rel-16: multiple downlink control information (multi-DCI) operation (e.g., where multiple DCI can be used to schedule and/or control transmission between a UE and gNBs) and single-DCI operation (e.g., where a single DCI can be used to schedule and/or control transmission between a UE and gNBs). For example, in multi-DCI multi-TRP, multiple Physical Downlink Control channels (PDCCHs) may be received by a UE from multiple TRPs (e.g., multiple gNBs). Each PDCCH may correspond to a different TRP and may schedule a physical downlink shared channel (PDSCH) transmission from its respective TRP to the UE. For example, for single-DCI multi-TRP, a single PDCCH may be received by a UE from one TRP (e.g., one gNB) of multiple TRPs (e.g., multiple gNBs). The single PDCCH from the one TRP may schedule PDSCH transmissions from each of the multiple TRPs to the UE.

In the multi-DCI solution for multi-TRP, each TRP may be scheduled by a control resource set (CORESET) with a corresponding CORESETPoolIndex from {0, 1}. When CORESETPoolIndex is not configured, it may be assumed to be zero. A maximum of three CORESET per bandwidth part (BWP) can be configured for each CORESETPoolIndex. A maximum of 5 total CORESET per BWP can be configured. In the multi-DCI solution for multi-TRP, physical downlink shared channels (PDSCH) may be allowed to be fully, partially, or non-overlapping. Further, hybrid automatic repeat request (HARQ)-acknowledgement (ACK) feedback may support both "separate" and "joint" feedback modes. A maximum of two codeword (CW) and 16 HARQ processes may be supported, which is the same as Rel-15.

Figure 10:
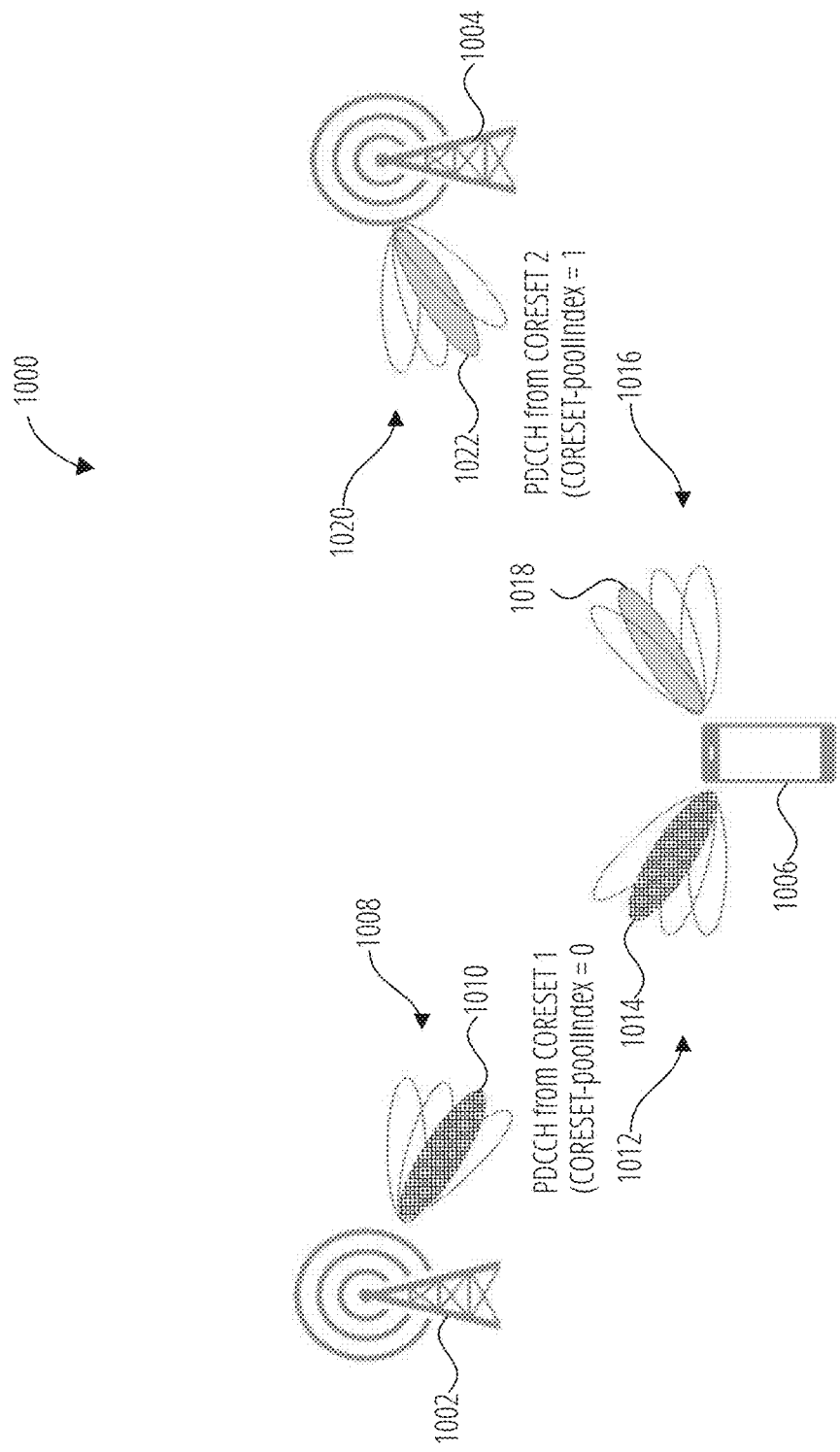
FIG. 10 illustrates an exemplary system for multiple transmission and reception point (multi-TRP) operation in accordance with some embodiments.

FIG. 10 illustrates an exemplary system 1000 for multi-TRP operation in accordance with some embodiments. In the embodiment shown, system 1000 includes a gNB 1002, a gNB 1004, and a UE 1006. UE 1006 and one or both of gNB 1002 and gNB 1004 may communicate with other using signals 1008, signals 1012, signals 1016, and signals 1020. For example, gNB 1002 and/or gNB 1004 are transmission and reception points (TRPs) in system 1000, and UE 1006 supports multi-TRP operation. For example, gNB 1002 transmits a signal 1010 of signals 1008 to UE 1006 and UE 1006 transmits a signal 1014 of signals 1012 to gNB 1002. For example, gNB 1004 transmits a signal 1022 of signals 1020 to UE 1006 and UE 1006 transmits a signal 1018 of signals 1016 to gNB 1004.

Multi-DCI mode based multi-TRP operation is shown in FIG. 10. For example, UE 1006 receives signals (e.g., signal 1010 and signal 1022 from multiple TRPs (e.g., gNB 1002 and gNB 1004) simultaneously, where the signal 1010 and signal 1022 are scheduled by multiple Physical Downlink Control channels (PDCCHs). PDCCHs from different TRPs (e.g., gNB 1002, gNB 1004) can be transmitted from different Control Resource Sets (CORESETs) for each of the TRPs having different CORESET-poolIndex values. For example, signal 1010 and/or signal 1014 for communication between UE 1006 and gNB 1002 use a PDCCH from CORESET 1 having a CORESET-poolIndex value of 0. For example, signal 1018 and/or signal 1022 for communication between UE 1006 and gNB 1004 use a PDCCH from CORESET 2 having a CORESET-poolindex value of 1. In some embodiments, the network of system 1000 (e.g., gNB 1002 and gNB 1004) having an multi-DCI mode may be deployed with an ideal-backhaul or non-ideal-backhaul. For example, a system with ideal-backhaul may have a latency less than at or about 2.5 microseconds and a throughput of up to at or about 10 Gbps. A system with non-ideal-backhaul may have a latency and throughout outside the ranges provided for ideal-backhaul.

In Rel-15, two processing capabilities are defined for the PDSCH and physical uplink shared channel (PUSCH) in 3GPP Technical Specification (TS) 38.214. For PDSCH, in terms of timing offset between PDSCH and HARQ-ACK, PDSCH processing capability 1 has regular HARQ-ACK feedback; PDSCH processing capability 2 has low latency HARQ-ACK feedback.

For PUSCH, in terms of timing offset between PDCCH and PUSCH, PUSCH processing capability 1 has regular PUSCH processing; PUSCH processing capability 2 has low latency PUSCH processing.

Some embodiments of the present disclosure may resolve PDSCH/PUSCH processing capability for Multi-TRP. Some embodiments may provide capability reporting for PDSCH/PUSCH processing capability. Some embodiments may provide PDSCH Processing Capability for TDMSchemeA Single DCI Multi-TRP scheme. Some embodiments may provide PDSCH Processing Capability for other Single DCI Multi-TRP schemes. Some embodiments of the present disclosure implement one or more of the following solutions.

Solutions 1.1-1.9 relate to capability reporting for PDSCH/PUSCH processing.
Solution 1.1

In some embodiments. PDSCH processing capability 2 does not apply to Multi-DCI Multi-TRP. For example, when a UE is configured with Multi-DCI Multi-TRP operation, the UE may not operate with PDSCH processing capability 2. In another example, when all UEs are configured with Multi-DCI Multi-TRP operation, none of the UEs may operate with PDSCH processing capability 2.
Solution 1.2

In some embodiments. PDSCH processing capability 2 does not apply to Single-DCI Multi-TRP. For example, when a UE is configured with Single-DCI Multi-TRP operation, the UE may not operate with PDSCH processing capability 2. In another example, when all UEs are config-ured with Single-DCI Multi-TRP operation, none of the UEs may operate with PDSCH processing capability 2.
Solution 1.3

In some embodiments, PUSCH processing capability 2 does not apply to Multi-DCI Multi-TRP. For example, when a UE is configured with Multi-DCI Multi-TRP operation, the UE may not operate with PUSCH processing capability 2. In another example, when all UEs are configured with Multi-DCI Multi-TRP operation, none of the UEs may operate with PUSCH processing capability 2.
Solution 1.4

In some embodiments, a UE can indicate the support of PDSCH capability 2 for Multi-DCI Multi-TRP. For example, the UE may issue a report to indicate the support. The report can be issued by the UE per feature set per component carrier (FSPC) (per component carrier (CC) per band per band combination), or per feature set (FS), or per band.
Solution 1.5

In some embodiments, a UE can indicate the support of PUSCH capability 2 for Multi-DCI Multi-TRP. For example, the UE may issue a report to indicate the support. The report can be issued by the UE per FSPC (per CC per band per band combination), or per FS (per band per band combination), or per band.
Solution 1.6

In some embodiments, a UE can indicate the support of PDSCH capability 2 for Single-DCI Multi-TRP. For example, the UE may issue a report to indicate the support. The report can be in a bitmap format to cover all 5 different Single-DCI Multi-TRP schemes (e.g., SDM, FDMSchemeA, FDMSchemeB, TDMSchemeA, Scheme 4). The report can be issued by the UE per FSPC (per CC per band per band combination), or per FS (per band per band combination), or per band.

For example, in SDM (Spatial Domain Multiplexing), spatial domain multiplexing of a single PDSCH occurs. Each TRP may map to one TCI (Transmission Configuration Indication) and one demodulation reference signal (DMRS) code division a multiplexing (CDM) group.

For example, in FDMSchemeA (Frequency Domain Multiplexing SchemeA), frequency domain multiplexing of a single PDSCH occurs. Each TRP may map to one TCI and half of Resource Elements (RE).

For example, in FDMSchemeB (Frequency Domain Multiplexing SchemeB), frequency domain multiplexing of two PDSCH of the same transport block (TB) occurs. Each TRP may map to one TCI and half of REs.

For example, in TDMSchemeA (Time Domain Multiplexing SchemeA), time domain multiplexing for two PDSCH of the same TB occurs. Each TRP may map to one TCI with Intra-slot TDM.

For example, in Scheme 4, time domain multiplexing for multiple PDSCH of the same TB occurs. Each TRP may map to one TCI or the same TCI with Inter-slot TDM.
Solution 1.7

In some embodiments, a UE can support PUSCH capability 2 for Multi-DCI Multi-TRP under certain conditions. For example, a UE can support PUSCH capability 2 for Multi-DCI Multi-TRP when there is no PDCCH to PUSCH Out of Order (OOO) Scheduling.
Solution 1.8

In some embodiments, a UE can only support PDSCH capability 2 for Multi-DCI Multi-TRP under certain conditions. For example, a UE can support PDSCH capability 2 for Multi-DCI Multi-TRP when there is one of, a subset of, or all of no PDCCH to PDSCH Out of Order (OOO)

Scheduling, no PDSCH to HARQ-ACK Out of Order (OOO) Scheduling, no Joint HARQ-ACK feedback, no overlapping in time domain scheduling, no overlapping in frequency domain scheduling, or no cross-carrier scheduling.

Solution 1.9

In some embodiments, a UE can only support PDSCH/PUSCH capability 2 with processing timeline relaxation. For example, the processing time relaxation can be either based on UE reporting or hardcoded in the specification. For example, the processing time relaxation may be used independently or jointly for Multi-DCI Multi-TRP PDSCH, Multi-DCI Multi-TRP PUSCH, and Single-DCI Multi-TRP PDSCH in each 5 schemes (e.g., SDM, FDMSchemeA, FDMSchemeB, TDMSchemeA, Scheme 4).

Solutions 2.1-2.4 relate to PDSCH processing capability for TDMSchemeA. For example, for TDMSchemeA, two PDSCH may be within a slot, the same duration and frequency resource allocation may be provided for each PDSCH, the same transport block (TB) may be transmitted twice, and the offset between the first PDSCH and the second PDSCH may be configured via radio resource configuration (RRC) signaling.

The current processing timeline for PDSCH in TDMSchemeA is described in 3GPP TS 38.214. As described by 3GPP TS 38.314, if the first uplink symbol of the PUCCH which carries the HARQ-ACK information, as defined by the assigned HARQ-ACK timing $K_1$ and the PUCCH resource to be used and including the effect of the timing advance, starts no earlier than at symbol $L_1$, where $L_1$ is defined as the next uplink symbol with its CP starting after $T_{proc,1} = (N_1 + d_{1,1} + d_2)(2048 + 144) \cdot \kappa 2^{-\mu} \cdot T_C + T_{ext}$ after the end of the last symbol of the PDSCH carrying the TB being acknowledged, then the UE shall provide a valid HARQ-ACK message.

For UE processing capability 1: If the PDSCH is mapping type B as given in clause 7.4.1.1 of [4, 3GPP TS 38.211], and
  if the number of PDSCH symbols allocated is L≥7, then $d_{1,1}=0$,
  if the number of PDSCH symbols allocated is L≥4 and L≤6, then $d_{1,1}=7-L$.
  if the number of PDSCH symbols allocated is L=3 then $d_{1,1}=3+\min(d,1)$, where d is the number of overlapping symbols of the scheduling PDCCH and the scheduled PDSCH.
  if the number of PDSCH symbols allocated is 2, then $d_{1,1}=3+d$, where d is the number of overlapping symbols of the scheduling PDCCH and the scheduled PDSCH.

For UE processing capability 2: If the PDSCH is mapping type B as given in clause 7.4.1.1 of [4, TS 38.211],
  if the number of PDSCH symbols allocated is L≥7, then $d_{1,1}=0$,
  if the number of PDSCH symbols allocated is L≥3 and L≤6, then $d_{1,1}$ is the number of overlapping symbols of the scheduling PDCCH and the scheduled PDSCH,
  if the number of PDSCH symbols allocated is 2,
  if the scheduling PDCCH was in a 3-symbol CORESET and the CORESET and the PDSCH had the same starting symbol, then $d_{1,1}=3$,
  otherwise $d_{1,1}$ is the number of overlapping symbols of the scheduling PDCCH and the scheduled PDSCH.

Embodiments of the present disclosure may determine how to determine HARQ-ACK processing timing (also referred to as timeline or time) $K_1$ such as, for example, a minimum HARQ-ACK timeline $K_1$. For example, for a first PDSCH (e.g., PDSCH 1) and a second PDSCH (e.g., PDSCH 2) in a slot, the minimum HARQ-ACK processing timeline or timing $K_1$ to the end of PDSCH 2 may define the timing or duration between PDSCH 2 and the corresponding HARQ-ACK in a PUCCH. The timing or duration may be defined by the last symbol of PDSCH 2 (e.g., the last PDSCH repetition) and the first symbol of a PUCCH that carriers the corresponding HARQ-ACK. This timing or duration may provide the UE with time to process the PDSCH. Embodiments of the present disclosure may provide solutions for determining this minimum HARQ-ACK processing timeline or timing $K_1$ to the end of PDSCH 2.

Solution 2.1

In some embodiments, the minimum HARQ-ACK processing timeline to the end of PDSCH 2 may be only based on PDSCH 1. For example, only symbols from PDSCH 1 may be considered.

Solution 2.2

In some embodiments, the minimum HARQ-ACK processing timeline to the end of PDSCH 2 may consider all symbols from the beginning of PDSCH 1 to the end of PDSCH 2, where blank symbols in between PDSCH 1 and PDSCH 2 are counted. For example, all the symbols from the first symbol of PDSCH 1 to the last symbol of PDSCH 2, inclusive, may be considered as PDSCH transmission. The duration L may correspond to the number of overlapping symbols with the CORESET/Scheduling PDCCH. For example, if PDSCH 1 has 4 symbols, followed by a 2 symbol gap (e.g., 2 blank symbols), followed by PDSCH 2 having 4 symbols, all symbols are considered for PDSCH 1, PDSCH 2, and the gap. Accordingly, the duration L=4 symbols of PDSCH 1+2 symbols of the gap+4 symbols of PDSCH 2=10.

Solution 2.3

In some embodiments, the minimum HARQ-ACK processing timeline to the end of PDSCH 2 may consider all the symbols in both PDSCH 1 and PDSCH 2. For example, all the symbols, union, in PDSCH 1 and PDSCH 2, may be considered, but blank symbols in between PDSCH 1 and PDSCH 2 may not be counted. The duration L may correspond to the number of overlapping symbols with the CORESET/Scheduling PDCCH. For example, if PDSCH 1 has 4 symbols, followed by a 2 symbol gap (e.g., 2 blank symbols), followed by PDSCH 2 having 4 symbols, symbols for only PDSCH 1 and PDSCH 2 are considered. The symbols of the gap are not considered. Accordingly, the duration L=4 symbols of PDSCH 1+4 symbols of PDSCH 2=8.

Solution 2.4

In some embodiments, the minimum HARQ-ACK processing timeline $K_1$ to the end of PDSCH 2 may be jointly based on the PDSCH 1 and PDSCH 2. For example, for PDSCH1, the minimum HARQ-ACK processing time k1_1 may be calculated, and for PDSCH2, the minimum HARQ-ACK processing time k1_2 may be calculated.

For example, the actual minimum HARQ-ACK processing time $K_1$ may be equal to one of the following alternatives: 1) max(k1_1−Offset, 0)+k1_2+C; 2) max(k1_1, k1_2)+C; or 3) k1_1+k1_2+C. For example, C can be zero, or used to provide additional timeline relaxation.

In some embodiments, PDSCH processing capability for multi-DCI multi-TRP may be provided.

Solution 3.1

In some embodiments, the minimum HARQ-ACK timeline to the end of PDSCH 2, for Multi-DCI based Multi-TRP, is based on the same design as TDMSchemeA. For example, it may be based on solutions 2.1, 2.2, 2.3, and/or 2.4, discussed above.

In some embodiments, PDSCH processing capability for other single-DCI multi-TRP may be provided.

Solution 4.1

In some embodiments, to determine minimum HARQ-ACK timeline to the end of PDSCH 2, for SDM SDCI MTRP scheme, the same scheme as Rel-15 (3GPP TS 38.214, discussed above) may be used since two PDSCH overlap with each other. Additional relaxation may be included considering the UE interference processing timeline.

Solution 4.2

In some embodiments, to determine minimum HARQ-ACK timeline to the end of PDSCH 2, for FDMSchemeA SDCI MTRP scheme, the same scheme as Rel-15 (3GPP TS 38.214, discussed above) may be used.

Solution 4.3

In some embodiments, to determine minimum HARQ-ACK timeline to the end of PDSCH 2, for FDMSchemeB SDCI MTRP scheme, the same scheme as Rel-15 (3GPP TS 38.214, discussed above) may be used, and relaxation may be included, for example, when UE supports CW soft combining.

Solution 4.4

In some embodiments, to determine minimum HARQ-ACK timeline to the end of PDSCH 2, for Scheme 4 SDCI MTRP scheme, the same scheme as Rel-15 (3GPP TS 38.214, discussed above) may be used, based on the first PDSCH transmission occasion.

Figure 1:
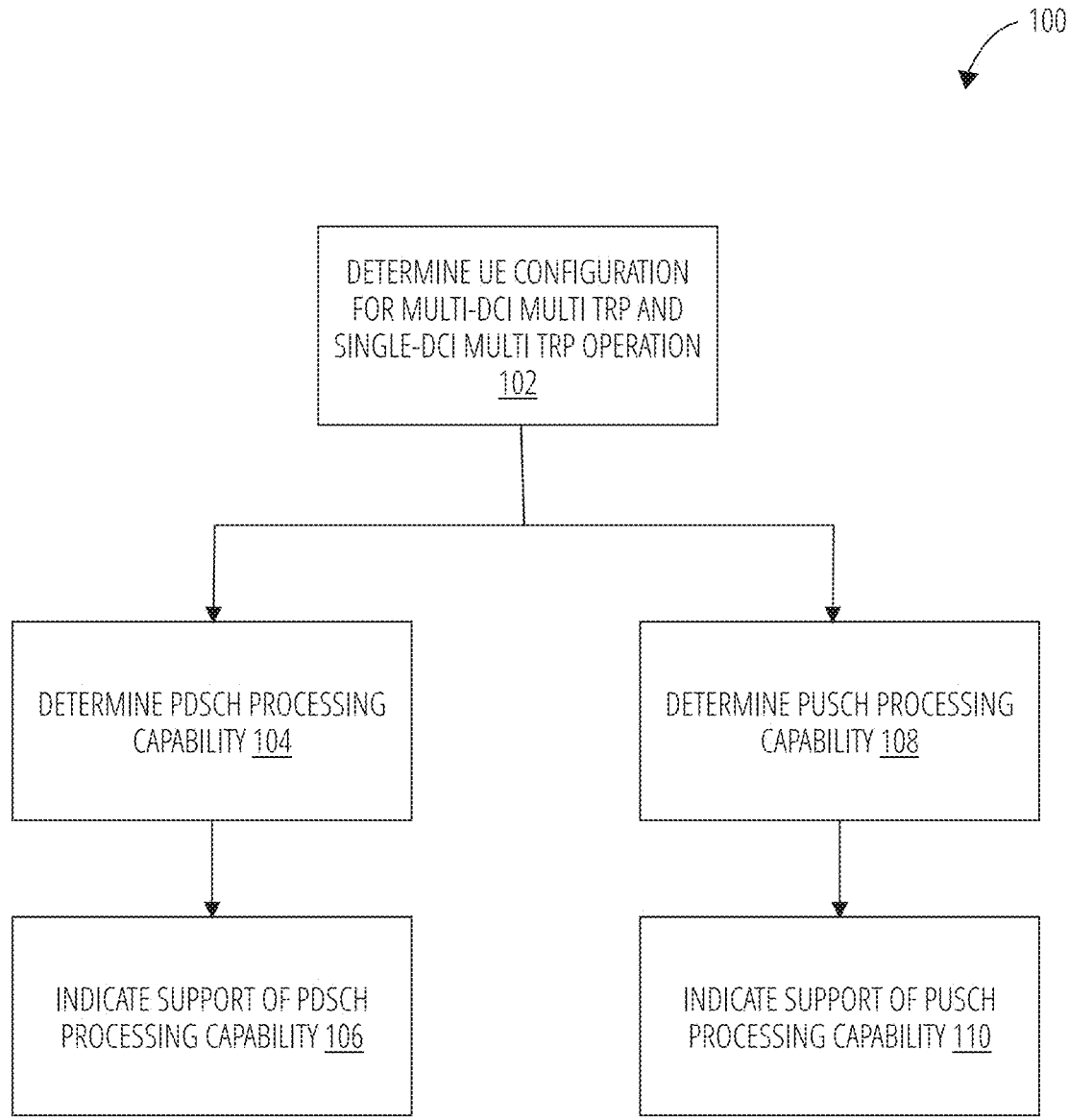
FIG. 1 illustrates a capability reporting process in accordance with some embodiments

FIG. 1 illustrates a capability reporting process 100 in accordance with some embodiments.

At block 102, a UE configuration for multi-DCI multi TRP operation and single-DCI multi TRP operation is determined. In some embodiments, UE configuration for only multi-DCI multi TRP is determined. In some embodiments, UE configuration for only single-DCI multi TRP operation is determined. In some embodiments, UE configuration for both multi-DCI multi TRP operation and single-DCI multi TRP operation is determined.

At block 104, PDSCH processing capability for timing offset between PDSCH and HARQ-ACK is determined for the determined multi-DCI multi TRP operation and/or single-DCI multi TRP operation. In some embodiments, for the timing offset between PDSCH and HARQ-ACK, PDSCH processing capability 1 uses regular HARQ-ACK feedback. In some embodiments, for the timing offset between PDSCH and HARQ-ACK, PDSCH processing capability 2 uses low latency HARQ-ACK feedback.

In some embodiments, the PDSCH processing capability is determined as PDSCH processing capability 1. In some embodiments, the PDSCH processing capability is determined as PDSCH processing capability 2.

In some embodiments, PDSCH processing capability 2 does not apply to Multi-DCI Multi-TRP operation. For example, when a UE is configured with Multi-DCI Multi-TRP operation, the UE may not operate with PDSCH processing capability 2. In another example, when all UEs are configured with Multi-DCI Multi-TRP operation, none of the UEs may operate with PDSCH processing capability 2.

In some embodiments, PDSCH processing capability 2 does apply to Multi-DCI Multi-TRP operation. For example, when a UE is configured with Multi-DCI Multi-TRP operation, the UE may operate with PDSCH processing capability 2. In another example, when all UEs are configured with Multi-DCI Multi-TRP operation, all the UEs may operate with PDSCH processing capability 2.

In some embodiments, a UE can only support PDSCH capability 2 for Multi-DCI Multi-TRP under certain conditions. For example, a UE can support PDSCH capability 2 for Multi-DCI Multi-TRP when there is one of, a subset of, or all of no PDCCH to PDSCH Out of Order (OOO) Scheduling, no PDSCH to HARQ-ACK Out of Order (OOO) Scheduling, no Joint HARQ-ACK feedback, no overlapping in time domain scheduling, no overlapping in frequency domain scheduling, or no cross-carrier scheduling.

In some embodiments, PDSCH processing capability 2 does not apply to Single-DCI Multi-TRP. For example, when a UE is configured with Single-DCI Multi-TRP operation, the UE may not operate with PDSCH processing capability 2. In another example, when all UEs are configured with Single-DCI Multi-TRP operation, none of the UEs may operate with PDSCH processing capability 2.

In some embodiments, PDSCH processing capability 2 does apply to Single-DCI Multi-TRP. For example, when a UE is configured with Single-DCI Multi-TRP operation, the UE may operate with PDSCH processing capability 2. In another example, when all UEs are configured with Single-DCI Multi-TRP operation, all the UEs may operate with PDSCH processing capability 2.

At block 106, support of the determined PDSCH processing capability is indicated. In some embodiments, a UE can indicate the support of PDSCH capability 2 for Multi-DCI Multi-TRP. For example, the UE may generate a report to indicate the support and issue or transmit the report. The report can be issued by the UE per feature set per component carrier (FSPC) (per CC per band per band combination), or per feature set (FS), or per band. In some embodiments, a UE can indicate the support of PDSCH capability 2 for Single-DCI Multi-TRP. For example, the UE may issue a report to indicate the support. The report can be in a bitmap format to cover all the 5 different Single-DCI Multi-TRP schemes (e.g., SDM, FDMSchemeA, FDMSchemeB, TDMSchemeA, Scheme 4). The report can be issued by the UE per FSPC (per CC per band per band combination), or per FS (per band per band combination), or per band.

At block 108, PUSCH processing capability for timing offset between PDCCH and PUSCH is determined for the determined multi-DCI multi TRP operation and/or single-DCI multi TRP operation. In some embodiments, for the timing offset between PDCCH and PUSCH, PUSCH processing capability 1 uses regular PUSCH processing. In some embodiments, for the timing offset between PDCCH and PUSCH, PUSCH processing capability 2 uses low latency PUSCH processing.

In some embodiments, the PUSCH processing capability is determined as PUSCH processing capability 1. In some embodiments, the PUSCH processing capability is determined as PUSCH processing capability 2.

In some embodiments. PUSCH processing capability 2 does not apply to Multi-DCI Multi-TRP. For example, when a UE is configured with Multi-DCI Multi-TRP operation, the UE may not operate with PUSCH processing capability 2. In another example, when all UEs are configured with Multi-DCI Multi-TRP operation, none of the UEs may operate with PUSCH processing capability 2.

In some embodiments, a UE can support PUSCH capability 2 for Multi-DCI Multi-TRP under certain conditions. For example, a UE can support PUSCH capability 2 for Multi-DCI Multi-TRP when there is no PDCCH to PUSCH Out of Order (OOO) Scheduling.

At block 110, support of the determined PUSCH processing capability is indicated. In some embodiments, a UE can indicate the support of PUSCH capability 2 for Multi-DCI Multi-TRP. For example, the UE may generate a report to indicate the support and issue or transmit the report. The report can be issued by the UE per FSPC (per CC per band per band combination), or per FS (per band per band combination), or per band.

In some embodiments, the reports of blocks 106 and 110 may be combined, such that a combined report including the reports of blocks 106 and 110 is generated and then issued or transmitted.

Regarding blocks 104 and 108, in some embodiments, a UE can only support PDSCH and/or PUSCH capability 2 with processing timeline relaxation. For example, the processing time relaxation can be either based on UE reporting or hardcoded in the specification, For example, the processing time relaxation may be used independently or jointly for Multi-DCI Multi-TRP PDSCH, Multi-DCI Multi-TRP PUSCH, and Single-DCI Multi-TRP PDSCH in each 5 schemes (e.g., SDM, FDMSchemeA, FDMSchemeB, TDMSchemeA, Scheme 4).

Figure 2:
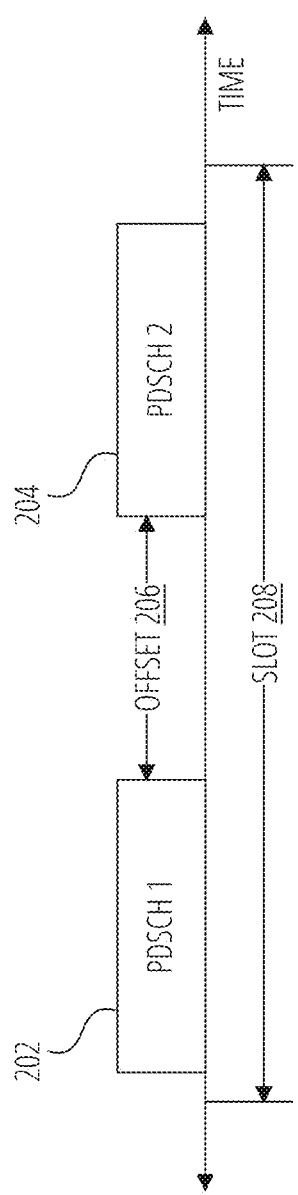
FIG. 2 illustrates a diagram showing physical downlink shared channels (PDSCH) in accordance with TDMSchemeA, according to some embodiments.

FIG. 2 illustrates a diagram 200 showing PDSCH in accordance with TDMSchemeA, according to some embodiments. Here, two PDSCH—a PDSCH 1 (202) and a PDSCH 2 (204)—are located in a slot 208. PDSCH 1 (202) and PDSCH 2 (204) are separated by an offset 206 within slot 208. For example, the offset 206 is between the last symbol of PDSCH 1 and the first symbol of PDSCH 2. In some embodiments, PDSCH1 and PDSCH 2 have the same duration and frequency resource allocation. In some embodiments, PDSCH1 and PDSCH 2 have a different duration and/or frequency resource allocation. In some embodiments, a transport block (TB) is transmitted by a UE two times for the slot. In some embodiments, the offset 206 between PDSCH 1 (202) and PDSCH 2 (204) is configured via RRC.

In some embodiments, PDSCH 1 (202) and PDSCH 2 (204) each include a set of symbols describing their payload. In some embodiments, the area between the end of PDSCH 1 (202) (e.g., last symbol of PDSCH 1) and beginning of PDSCH 2 (204) (e.g., first symbol of PDSCH 2), signified by offset 206, includes one or more blank symbols corresponding to the duration of offset 206.

As discussed above, the processing timeline for PDSCH in TDMSchemeA is described in 3GPP TS 38.214. As described by 3GPP TS 38.314, if the first uplink symbol of the PUCCH which carries the HARQ-ACK information, as defined by the assigned HARQ-ACK timing $K_1$ and the PUCCH resource to be used and including the effect of the timing advance, starts no earlier than at symbol $L_1$, where $L_1$ is defined as the next uplink symbol with its CP starting after $T_{proc,1}=(N_1+d_{1,1}+d_2)(2048+144)\cdot\kappa 2^{-\mu}\cdot T_C+T_{ext}$ after the end of the last symbol of the PDSCH carrying the TB being acknowledged, then the UE shall provide a valid HARQ-ACK message. The below defines parameters of this equation.

For UE processing capability 1: If the PDSCH is mapping type B as given in clause 7.4.1.1 of [4, TS 38.211], and
 if the number of PDSCH symbols allocated is L≥7, then $d_{1,1}=0$,
 if the number of PDSCH symbols allocated is L≥4 and L≤6, then $d_{1,1}=7-L$.
 if the number of PDSCH symbols allocated is L=3 then $d_{1,1}=3+\min(d,1)$, where d is the number of overlapping symbols of the scheduling PDCCH and the scheduled PDSCH.

if the number of PDSCH symbols allocated is 2, then $d_{1,1}=3+d$, where d is the number of overlapping symbols of the scheduling PDCCH and the scheduled PDSCH.

For UE processing capability 2: If the PDSCH is mapping type B as given in clause 7.4.1.1 of [4, TS 38.211],
 if the number of PDSCH symbols allocated is L≥7, then $d_{1,1}=0$,
 if the number of PDSCH symbols allocated is L≥3 and L≤6, then $d_{1,1}$ is the number of overlapping symbols of the scheduling PDCCH and the scheduled PDSCH,
 if the number of PDSCH symbols allocated is 2,
 if the scheduling PDCCH was in a 3-symbol CORESET and the CORESET and the PDSCH had the same starting symbol, then $d_{1,1}=3$,
 otherwise $d_{1,1}$ is the number of overlapping symbols of the scheduling PDCCH and the scheduled PDSCH.

In some embodiments, the HARQ-ACK processing timing $K_1$ is determined as described with reference to FIGS. 3-5. In some embodiments, a minimum HARQ-ACK timing $K_1$ is determined.

Figure 3:
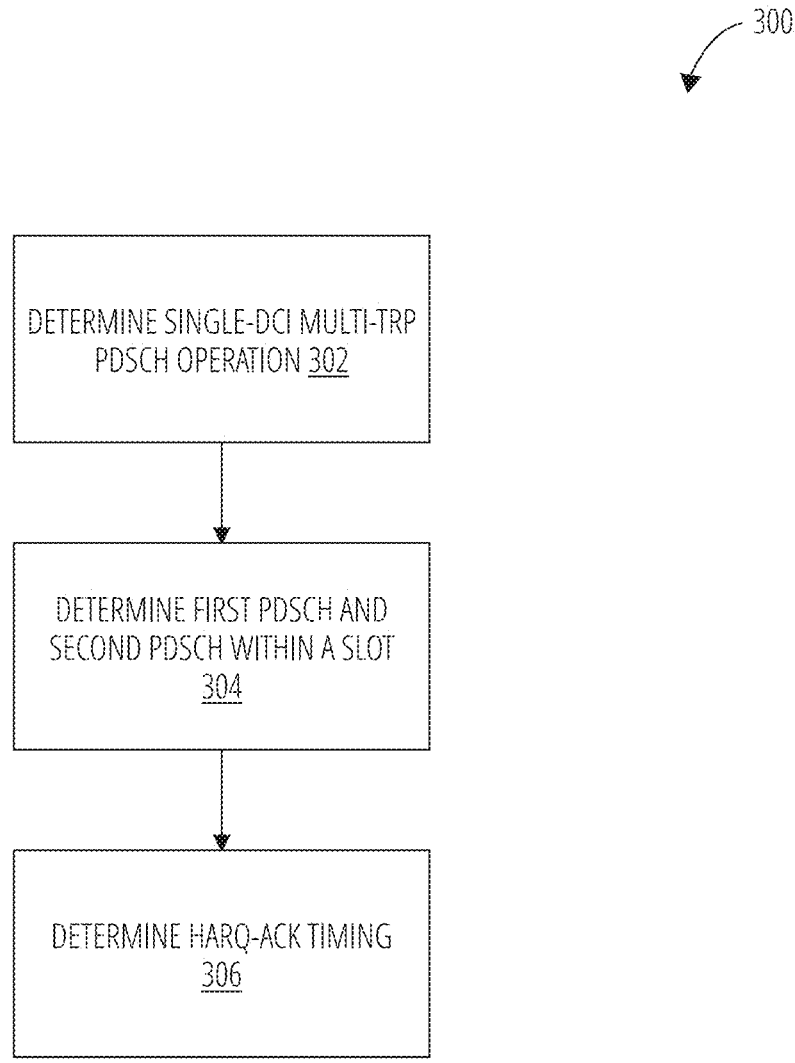
FIG. 3 illustrates a process for PDSCH processing in accordance with some embodiments.

FIG. 3 illustrates a process 300 for PDSCH processing in accordance with some embodiments.

At block 302, single-DCI multi-TRP PDSCH operation is determined. In some embodiments, the single-DCI multi-TRP PDSCH operation is TDMSchemeA operation. In some embodiments, the determination includes determining that a UE is configured for single-DCI multi-TRP PDSCH operation. In some embodiments, the determination includes determining that a UE is configured for TDMSchemeA operation.

At block 304, a first PDSCH and a second PDSCH (e.g., PDSCH 1 (202) and PDSCH 2 (204) within a slot (e.g., slot 208) in accordance with the determined single-DCI multi-TRP PDSCH operation are determined. For example, the first PDSCH and second PDSCH may be used in the determined single-DCI multi-TRP PDSCH operation. In some embodiments, the duration and/or frequency resource allocation for each PDSCH is determined. In some embodiments, the duration and/or frequency resource allocation for the first PDSCH and the second PDSCH are the same, for instance, when the single-DCI multi-TRP PDSCH operation is TDMSchemeA.

At block 306, HARQ-ACK timing for the first PDSCH and the second PDSCH is determined. In some embodiments, the determined HARQ-ACK timing is a minimum HARQ-ACK timing. In some embodiments, one or more symbols of the first PDSCH are used to determine the minimum HARQ-ACK timing. In some embodiments, one or more symbols of the first PDSCH and the second PDSCH are used to determine the minimum HARQ-ACK timing.

In some embodiments, the minimum HARQ-ACK timing is to the end of the second PDSCH. Here, for example, for the first PDSCH and the second PDSCH in the slot, the minimum HARQ-ACK processing timeline or timing $K_1$ to the end of the second PDSCH may define the timing or duration between the second PDSCH and the corresponding HARQ-ACK in a PUCCH. The timing or duration may be defined by the last symbol of the second PDSCH (e.g., the last PDSCH repetition) and the first symbol of a PUCCH that carriers the corresponding HARQ-ACK. This timing or duration may provide the UE with time to process the PDSCH.

In some embodiments, determining the minimum HARQ-ACK timing to the end of the second PDSCH may be only based on the first PDSCH. For example, only symbols from the first symbol of the first PDSCH (e.g., PDSCH 1 (202))

to the last symbol of the first PDSCH are considered for the PDSCH transmission and to determine the minimum HARQ-ACK timing.

In some embodiments, the minimum HARQ-ACK processing timing to the end of the second PDSCH may consider all symbols from the beginning of the first PDSCH to the end of the second PDSCH, where blank symbols in between the first PDSCH and the second PDSCH are counted. For example, all the symbols from the first symbol of the first PDSCH to the last symbol of the second PDSCH, inclusive, may be considered for the PDSCH transmission and to determine the minimum HARQ-ACK timing. For example, the duration L may correspond to the number of overlapping symbols with the CORESET/Scheduling PDCCH. For example, if the first PDSCH has 4 symbols, followed by a 2 symbol gap (e.g., 2 blank symbols), followed by the second PDSCH having 4 symbols, all symbols are considered for the first PDSCH, second PDSCH, and the gap. Accordingly, the duration L=4 symbols of the first PDSCH+2 symbols of the gap+4 symbols of the second PDSCH=10.

In some embodiments, the minimum HARQ-ACK processing timeline to the end of the second PDSCH may consider all the symbols in both the first PDSCH and the second PDSCH. For example, all the symbols, union, in the first PDSCH and the second PDSCH may be considered, but blank symbols in between the first PDSCH and the second PDSCH (e.g., in an offset region between the two) may not be counted, for the PDSCH transmission and to determine the minimum HARQ-ACK timing. For example, the duration L may correspond to the number of overlapping symbols with the CORESET/Scheduling PDCCH. For example, if the first PDSCH has 4 symbols, followed by a 2 symbol gap (e.g., 2 blank symbols), followed by the second PDSCH having 4 symbols, symbols for only the first PDSCH and the second PDSCH are considered. The symbols of the gap are not considered. Accordingly, the durationL=4 symbols of the first PDSCH+4 symbols of the second PDSCH=8.

Figure 4:
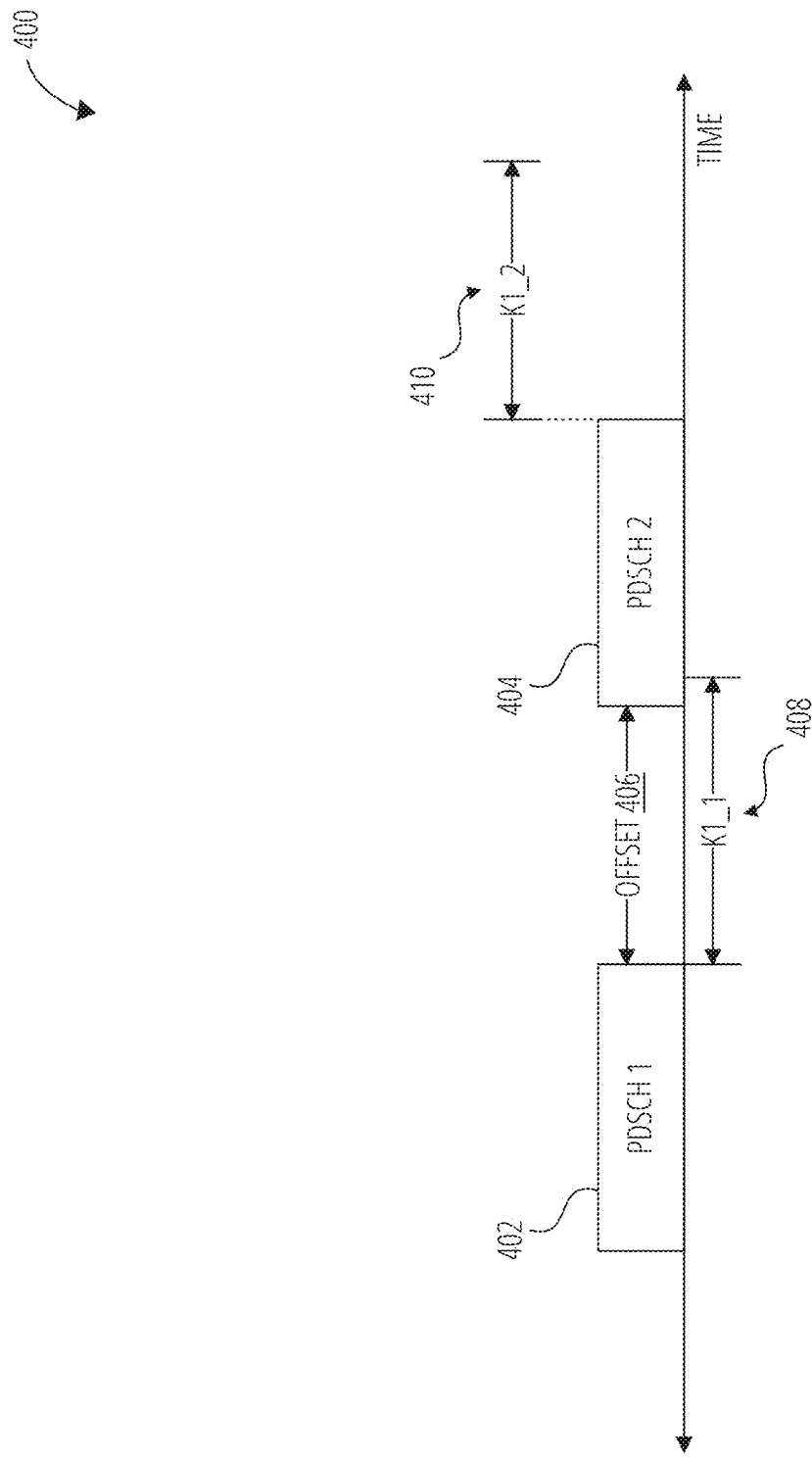
FIG. 4 illustrates another diagram showing PDSCH in accordance with TDMSchemeA, according to some embodiments.

FIG. 4 illustrates a diagram 400 showing PDSCH in accordance with TDMSchemeA, according to some embodiments. Here, two PDSCH—a first PDSCH (PDSCH 1 (402)) and a second PDSCH (PDSCH 2 (404))—are separated by an offset 406. In some embodiments, the first PDSCH and the second PDSCH have the same duration and frequency resource allocation. In some embodiments, the first PDSCH and the second PDSCH have a different duration and/or frequency resource allocation. In some embodiments, a transport block (TB) is transmitted by a UE two times for the slot. In some embodiments, the offset 406 between the first PDSCH 402 and the second PDSCH 404 is configured via RRC.

As shown by diagram 400, an initial minimum HARQ-ACK processing timing k1_1 is shown by item 408, and an initial minimum HARQ-ACK processing timing k1_2 is shown by item 410. k1_1 and k1_2 are used as discussed below in relation to FIG. 5 to determine an overall minimum HARQ-ACK processing time $K_1$.

Figure 5:
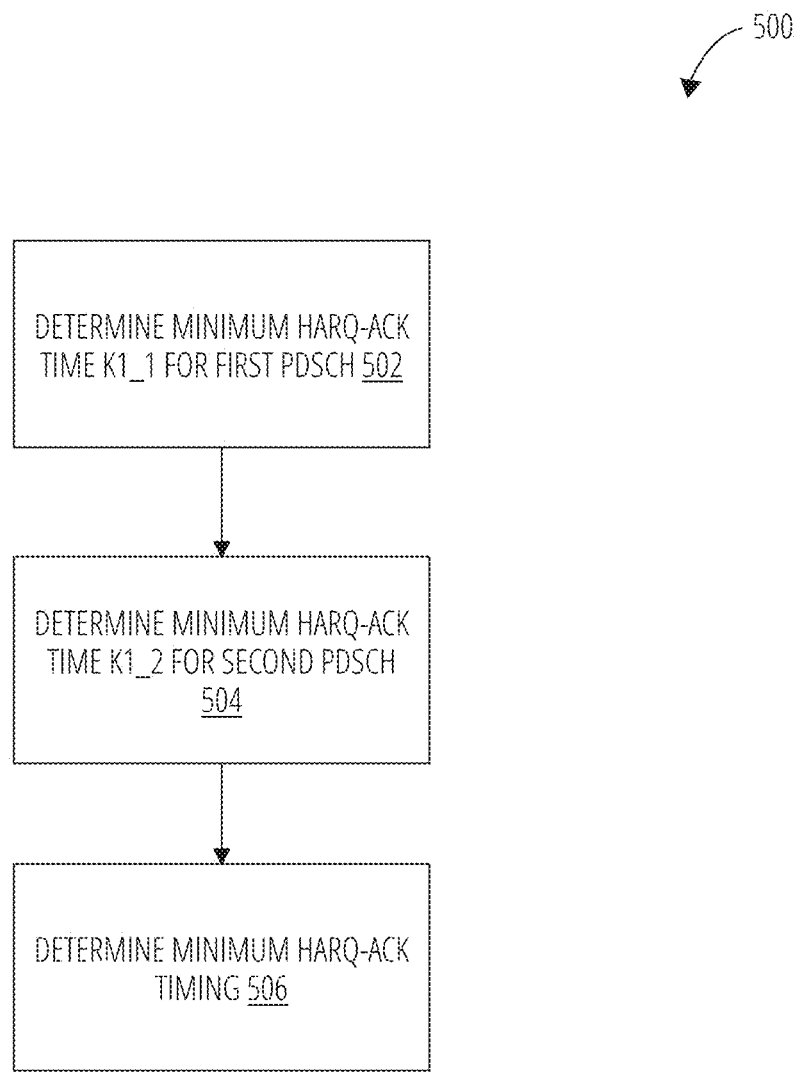
FIG. 5 illustrates a process of determining an overall minimum HARQ-ACK processing time in accordance with some embodiments.

Indeed, FIG. 5 shows a process 500 of determining an overall minimum HARQ-ACK processing time $K_1$ using the values k1_1 and k1_2. Thus, here, the minimum HARQ-ACK processing timeline to the end of the second PDSCH is jointly based on the first PDSCH (PDSCH 1 (402)) and the second PDSCH (PDSCH 2 (404)). In some embodiments, process 500 reflects processing of exemplary blocks 304 and 306 of process 300, shown in FIG. 3.

At block 502, the minimum HARQ-ACK processing timing k1_1 is determined for the first PDSCH.

At block 504, the minimum HARQ-ACK processing timing k1_2 is determined for the second PDSCH.

At block 506, the overall minimum HARQ-ACK processing timing (also referred to as time) $K_1$ for the first PDSCH and the second PDSCH is determined using k1_1 and k1_2. In some embodiments, the overall minimum HARQ-ACK processing time $K_1$=max(k1_1−Offset, 0)+k1_2+C. In some embodiments, the overall minimum HARQ-ACK processing time $K_1$=max(k1_1, k1_2)+C. In some embodiment, the overall minimum HARQ-ACK processing time $K_1$=k1_1+k1_2+C. For example, Offset may be the offset between the first PDSCH and the second PDSCH (e.g., offset 406). For example, Offset may be the offset between the last symbol of the first PDSCH and the first symbol of the second PDSCH. For example, C may be a constant and can be zero, or can be set to a value that provides additional timeline relaxation. For example, "max(X, Y)" means that the maximum value of the series of values X and Y in parentheses is selected. Thus, if X is greater than Y, max(X, Y)=X.

It should be noted that, in some embodiments, the minimum HARQ-ACK timeline to the end of the second PDSCH (PDSCH 2 (404)), for Multi-DCI based Multi-TRP, uses the same processes described above for TDMSchemeA. For example, determining the minimum HARQ-ACK for Multi-DCI based Multi-TRP may be performed using one or more of the techniques described in FIGS. 2-5.

In some embodiments, PDSCH processing capability for other single DCI MTRP may also be provided.

The processing timeline for PDSCH in TDMSchemeA is described in 3GPP TS 38.214 may be further used in the following embodiments. As described by 38.314, if the first uplink symbol of the PUCCH which carries the HARQ-ACK information, as defined by the assigned HARQ-ACK timing $K_1$ and the PUCCH resource to be used and including the effect of the timing advance, starts no earlier than at symbol $L_1$, where $L_1$ is defined as the next uplink symbol with its CP starting after $T_{proc,1}=(N_1+d_{1,1}+d_2)(2048+144)\cdot\kappa 2^{-\mu}\cdot T_C+T_{ext}$ after the end of the last symbol of the PDSCH carrying the TB being acknowledged, then the UE shall provide a valid HARQ-ACK message. The below defines parameters of this equation.

For UE processing capability 1: If the PDSCH is mapping type B as given in clause 7.4.1.1 of [4, TS 38.211], and
- if the number of PDSCH symbols allocated is L≥7, then $d_{1,1}=0$,
- if the number of PDSCH symbols allocated is L≥4 and L≤6, then $d_{1,1}=7-L$.
- if the number of PDSCH symbols allocated is L=3 then $d_{1,1}=3+\min(d,1)$, where d is the number of overlapping symbols of the scheduling PDCCH and the scheduled PDSCH.
- if the number of PDSCH symbols allocated is 2, then $d_{1,1}=3+d$, where d is the number of overlapping symbols of the scheduling PDCCH and the scheduled PDSCH.

For UE processing capability 2: If the PDSCH is mapping type B as given in clause 7.4.1.1 of [4, TS 38.211],
- if the number of PDSCH symbols allocated is L≥7, then $d_{1,1}=0$,
- if the number of PDSCH symbols allocated is L≥3 and L≤6, then $d_{1,1}$ is the number of overlapping symbols of the scheduling PDCCH and the scheduled PDSCH,
- if the number of PDSCH symbols allocated is 2,
- if the scheduling PDCCH was in a 3-symbol CORESET and the CORESET and the PDSCH had the same starting symbol, then $d_{1,1}=3$, otherwise $d_{1,1}$ is the number of overlapping symbols of the scheduling PDCCH and the scheduled PDSCH.

In some embodiments, to determine minimum HARQ-ACK timeline to the end of PDSCH 2, for SDM SDCI MTRP scheme, the same scheme as Rel-15 (3GPP TS 38.214, discussed above) may be used since two PDSCH overlap with each other. Additional relaxation may be included considering the UE interference processing timeline In some embodiments, to determine minimum HARQ-ACK timeline to the end of PDSCH 2, for FDMSchemeA SDCI MTRP scheme, the same scheme as Rel-15 (3GPP TS 38.214, discussed above) may be used.

In some embodiments, to determine minimum HARQ-ACK timeline to the end of PDSCH 2, for FDMSchemeB SDCI MTRP scheme, the same scheme as Rel-15 (3GPP TS 38.214, discussed above) may be used, and relaxation may be included, for example, when UE supports CW soft combining In some embodiments, to determine minimum HARQ-ACK timeline to the end of PDSCH 2, for Scheme 4 SDCI MTRP scheme, the same scheme as Rel-15 (3GPP TS 38.214, discussed above) may be used, based on the first PDSCH transmission occasion.

Figure 6:
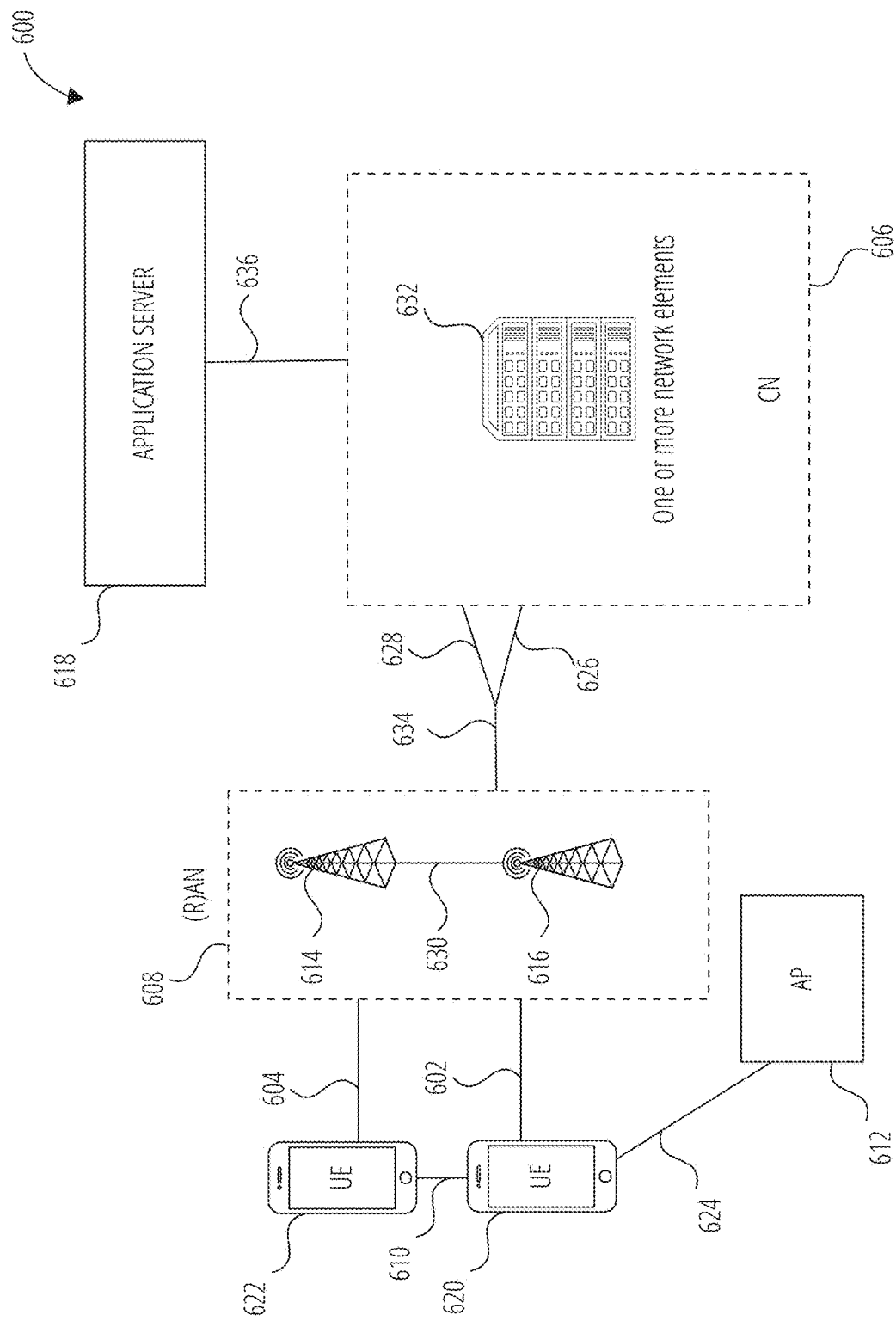
FIG. 6 illustrates system architecture in accordance with some embodiments

FIG. 6 illustrates an example architecture of a system 600 of a network, in accordance with various embodiments. The following description is provided for an example system 600 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems. IEEE 802.16 protocols (e.g., WMAN, WiMAX, etc.), or the like.

As shown by FIG. 6, the system 600 includes UE 622 and UE 620. In this example, the UE 622 and the UE 620 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 622 and/or the UE 620 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 622 and UE 620 may be configured to connect, for example, communicatively couple, with an access node or radio access node (shown as (R)AN 608). In embodiments, the (R)AN 608 may be an NG RAN or a 5G RAN, an E-UTRAN, or a legacy RAN, such as a UTRAN or GERAN. As used herein, the term "NG RAN" or the like may refer to a (R)AN 608 that operates in an NR or 5G system, and the term "E-UTRAN" or the like may refer to a (R)AN 608 that operates in an LTE or 4G system. The UE 622 and UE 620 utilize connections (or channels) (shown as connection 604 and connection 602, respectively), each of which comprises a physical communications interface or layer (discussed in further detail below).

In this example, the connection 604 and connection 602 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UE 622 and UE 620 may directly exchange communication data via a ProSe interface 610. The ProSe interface 610 may alternatively be referred to as a sidelink (SL) interface 110 and may comprise one or more logical channels, including but not limited to a PSCCH, a PSSCH, a PSDCH, and a PSBCH.

The UE 620 is shown to be configured to access an AP 612 (also referred to as "WLAN node," "WLAN," "WLAN Termination," "WT" or the like) via connection 624. The connection 624 can comprise a local wireless connection, such as a connection consistent with any IEEE 802.11 protocol, wherein the AP 612 would comprise a wireless fidelity (Wi-Fi®) router. In this example, the AP 612 may be connected to the Internet without connecting to the core network of the wireless system (described in further detail below). In various embodiments, the UE 620, (R)AN 608, and AP 612 may be configured to utilize LWA operation and/or LWIP operation. The LWA operation may involve the UE 620 in RRC_CONNECTED being configured by the RAN node 614 or the RAN node 616 to utilize radio resources of LTE and WLAN. LWIP operation may involve the UE 620 using WLAN radio resources (e.g., connection 624) via IPsec protocol tunneling to authenticate and encrypt packets (e.g., IP packets) sent over the connection 624. IPsec tunneling may include encapsulating the entirety of original IP packets and adding a new packet header, thereby protecting the original header of the IP packets.

The (R)AN 608 can include one or more AN nodes, such as RAN node 614 and RAN node 616, that enable the connection 604 and connection 602. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or 5G system (for example, a gNB), and the term "E-UTRAN node" or the like may refer to a RAN node that operates in an LTE or 4G system 600 (e.g., an eNB). According to various embodiments, the RAN node 614 or RAN node 616 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 614 or RAN node 616 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 614 or RAN node 616); a MAC/PHY split wherein RRC, PDCP, RLC, and MAC layers are operated by the CRAN/vBBUP and the PHY layer is operated by individual RAN nodes (e.g., RAN node 614 or RAN node 616); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 614 or RAN node 616 to perform other virtualized applications. In some implementations, an individual RAN node may represent individual gNB-DUs that are connected to a gNB-CU via individual F1 interfaces (not shown by FIG. 6). In these implementations, the gNB-DUs may include one or more remote radio heads or RFEMs. and the gNB-CU may be operated by a server that is located in the (R)AN 608 (not shown) or by a server pool in a similar manner as the CRAN/vBBUP. Additionally, or alternatively, one or more of the RAN node 614 or RAN node 616 may be next generation eNBs (ng-eNBs), which are RAN nodes that provide E-UTRA user plane and control plane protocol terminations toward the UE 622 and UE 620, and are connected to an SGC via an NG interface (discussed infra). In V2X scenarios one or more of the RAN node 614 or RAN node 616 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/ software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally. or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 614 and/or the RAN node 616 can terminate the air interface protocol and can be the first point of contact for the UE 622 and UE 620. In some embodiments, the RAN node 614 and/or the RAN node 616 can fulfill various logical functions for the (R)AN 608 including, but not limited to, radio network controller (RNC) functions such as radio bearer management, uplink and downlink dynamic radio resource management and data packet scheduling, and mobility management.

In embodiments, the UE 622 and UE 620 can be configured to communicate using OFDM communication signals with each other or with the RAN node 614 and/or the RAN node 616 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 614 and/or the RAN node 616 to the UE 622 and UE 620, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements: in the frequency domain, this may represent the smallest quantity of resources that currently can be allocated. There are several different physical downlink channels that are conveyed using such resource blocks.

According to various embodiments, the UE 622 and UE 620 and the RAN node 614 and/or the RAN node 616 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 622 and UE 620 and the RAN node 614 or RAN node 616 may operate using LAA, eLAA, and/or feLAA mechanisms. In these implementations, the UE 622 and UE 620 and the RAN node 614 or RAN node 616 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 622 and UE 620, RAN node 614 or RAN node 616, etc.)

senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 622, AP 612, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 622 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 622 and UE 620.

The PDCCH carries information about the transport format and resource allocations related to the PDSCH channel, among other things. It may also inform the UE 622 and UE 620 about the transport format, resource allocation, and HARQ information related to the uplink shared channel. Typically, downlink scheduling (assigning control and shared channel resource blocks to the UE 620 within a cell) may be performed at any of the RAN node 614 or RAN node 616 based on channel quality information fed back from any of the UE 622 and UE 620. The downlink resource assignment information may be sent on the PDCCH used for (e.g., assigned to) each of the UE 622 and UE 620.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 614 or RAN node 616 may be configured to communicate with one another via interface 630. In embodiments where the system 600 is an LTE system (e.g., when CN 606 is an EPC), the interface 630 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 622 from an SeNB for user data; information of PDCP PDUs that were not delivered to a UE 622: information about a current minimum desired buffer size at the Se NB for transmitting to the UE user data: and the like. The X2-C may provide intra-LTE access mobility functionality, including context transfers from source to target eNBs, user plane transport control, etc.; load management functionality; as well as inter-cell interference coordination functionality.

In embodiments where the system 600 is a 5G or NR system (e.g., when CN 606 is an 5GC), the interface 630 may be an Xn interface. The Xn interface is defined between two or more RAN nodes (e.g., two or more gNBs and the like) that connect to SGC, between a RAN node 614 (e.g., a gNB) connecting to SGC and an eNB, and/or between two eNBs connecting to 5GC (e.g., CN 606). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 622 in a connected mode (e.g., CM-CONNECTED) including functionality to manage the UE mobility for connected mode between one or more RAN node 614 or RAN node 616. The mobility support may include context transfer from an old (source) serving RAN node 614 to new (target) serving RAN node 616; and control of user plane tunnels between old (source) serving RAN node 614 to new (target) serving RAN node 616. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 608 is shown to be communicatively coupled to a core network—in this embodiment, CN 606. The CN 606 may comprise one or more network elements 632, which are configured to offer various data and telecommunications services to customers/subscribers (e.g., users of UE 622 and UE 620) who are connected to the CN 606 via the (R)AN 608. The components of the CN 606 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 606 may be referred to as a network slice, and a logical instantiation of a portion of the CN 606 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 618 may be an element offering applications that use IP bearer resources with the core network (e.g., UMTS PS domain, LTE PS data services, etc.). The application server 618 can also be configured to support one or more communication services (e.g., VoIP sessions, PTT sessions, group communication sessions, social networking services, etc.) for the UE 622 and UE 620 via the EPC. The application server 618 may communicate with the CN 606 through an IP communications interface 636.

In embodiments, the CN 606 may be an SGC, and the (R)AN 116 may be connected with the CN 606 via an NG interface 634. In embodiments, the NG interface 634 may be split into two parts, an NG user plane (NG-U) interface 626, which carries traffic data between the RAN node 614 or RAN node 616 and a UPF, and the S1 control plane (NG-C) interface 628, which is a signaling interface between the RAN node 614 or RAN node 616 and AMFs.

In embodiments, the CN 606 may be a 5G CN, while in other embodiments, the CN 606 may be an EPC). Where CN 606 is an EPC, the (R)AN 116 may be connected with the CN 606 via an S1 interface 634. In embodiments, the S1 interface 634 may be split into two parts, an S1 user plane (S1-U) interface 626, which carries traffic data between the RAN node 614 or RAN node 616 and the S-GW, and the S1-MME interface 628, which is a signaling interface between the RAN node 614 or RAN node 616 and MMEs.

Figure 7:
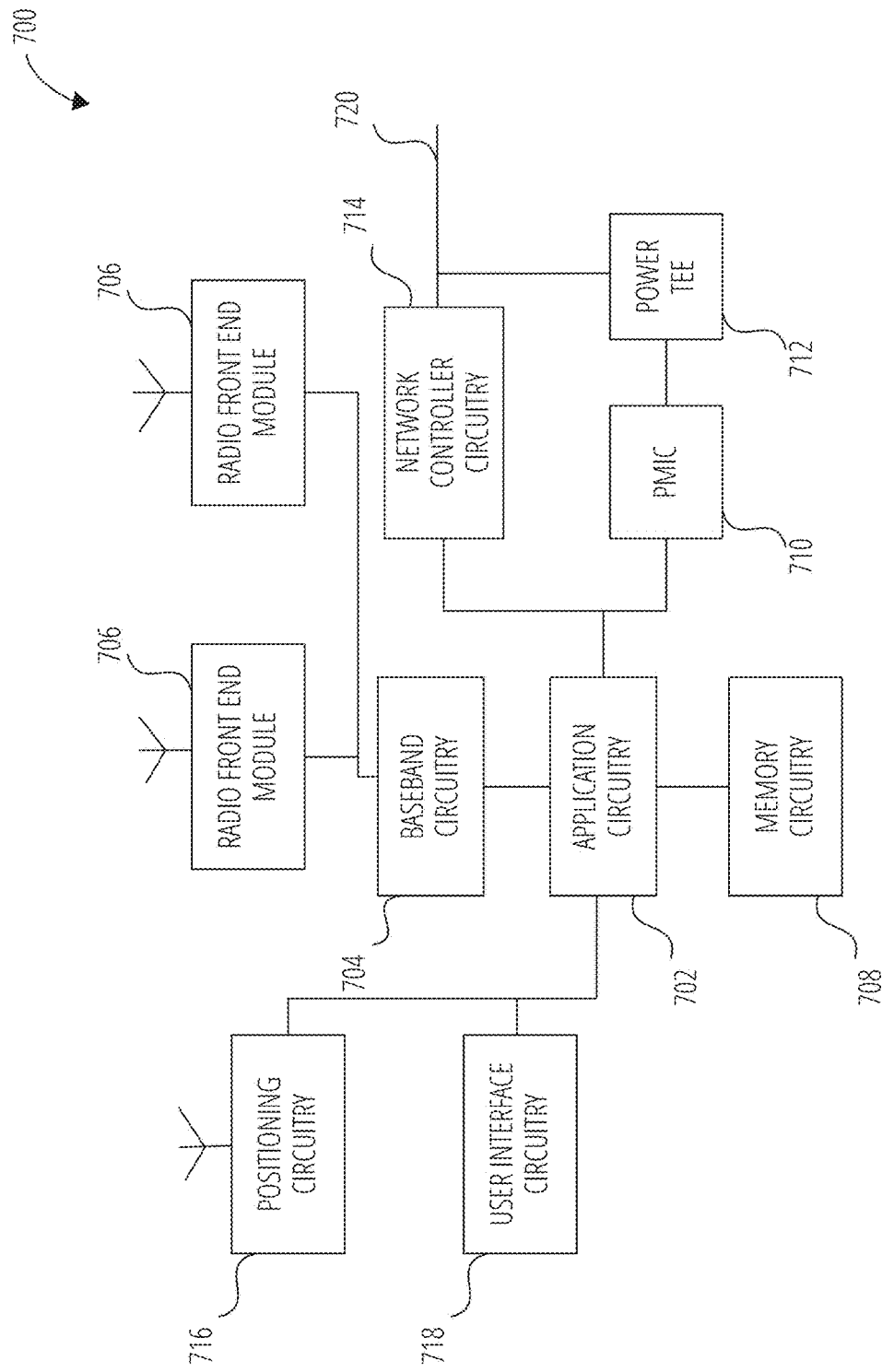
FIG. 7 illustrates infrastructure equipment in accordance with some embodiments.

FIG. 7 illustrates an example of infrastructure equipment 700 in accordance with various embodiments. The infrastructure equipment 700 may be implemented as a base station, radio head, RAN node, AN, application server, and/or any other element/device discussed herein. In other examples, the infrastructure equipment 700 could be implemented in or by a UE.

The infrastructure equipment 700 includes application circuitry 702, baseband circuitry 704, one or more radio front end module 706 (RFEM), memory circuitry 708, power management integrated circuitry (shown as PMIC 710), power tee circuitry 712, network controller circuitry 714, network interface connector 720, satellite positioning circuitry 716, and user interface circuitry 718. In some embodiments, the device infrastructure equipment 700 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 702 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 702 may be coupled with or may include memory/storage elements and may be configured to execute instructions stored in the memory/storage to enable various applications or operating systems to run on the infrastructure equipment 700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 702 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 702 may comprise, or may be, a special-purpose processor/controller to operate according to the various embodiments herein. As examples, the processor(s) of application circuitry 702 may include one or more Intel Pentium®, Core®, or Xeon® processor(s): Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.: a MIPS-based design from MIPS Technologies, Inc. such as MIPS Warrior P-class processors; and/or the like. In some embodiments, the infrastructure equipment 700 may not utilize application circuitry 702, and instead may include a special-purpose processor/controller to process IP data received from an EPC or 5GC, for example.

In some implementations, the application circuitry 702 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like: ASICs such as structured ASICs and the like; programmable SoCs (PSoCs); and the like. In such implementations, the circuitry of application circuitry 702 may comprise logic blocks or logic fabric, and other interconnected resources that may be programmed to perform various functions, such as the procedures, methods, functions, etc. of the various embodiments discussed herein. In such embodiments, the circuitry of application circuitry 702 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like. The baseband circuitry 704 may be implemented, for example, as a solder-down substrate including one or more integrated circuits, a single packaged integrated circuit soldered to a main circuit board or a multi-chip module containing two or more integrated circuits.

The user interface circuitry 718 may include one or more user interfaces designed to enable user interaction with the infrastructure equipment 700 or peripheral component interfaces designed to enable peripheral component interaction with the infrastructure equipment 700. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 706 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 706, which incorporates both mmWave antennas and sub-mmWave.

The memory circuitry 708 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D)cross-point (XPOINT) memories from Intel® and Micron®. The memory circuitry 708 may be implemented as one or more of solder down packaged integrated circuits, socketed memory modules and plug-in memory cards.

The PMIC 710 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 712 may provide for electrical power drawn from a network cable to provide both power supply and data connectivity to the infrastructure equipment 700 using a single cable.

The network controller circuitry 714 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 700 via network interface connector 720 using a physical connection, which may be electrical (commonly referred to as a "copper interconnect"), optical, or wireless. The network controller circuitry 714 may include one or more dedicated processors and/or FPGAs to communicate using one or more of the aforementioned protocols. In some implementations, the network controller circuitry 714 may include multiple controllers to provide connectivity to other networks using the same or different protocols.

The positioning circuitry 716 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 716 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 716 may include a Micro-Technology for Positioning, Navigation, and Timing (Micro-PNT) IC that uses a master timing clock to perform position tracking/estimation without GNSS assistance. The positioning circuitry 716 may also be part of, or interact with, the baseband circuitry 704 and/or radio front end module 706 to communicate with the nodes and components of the positioning network. The positioning circuitry 716 may also provide position data and/or time data to the application circuitry 702, which may use the data to synchronize operations with various infrastructure, or the like. The components shown by FIG. 7 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCIe), or any number of other technologies. The bus/IX may be a proprietary bus, for example, used in a SoC based system. Other bus/IX systems may be included, such as an I$^2$C interface, an SPI interface, point to point interfaces, and a power bus, among others.

Figure 8:
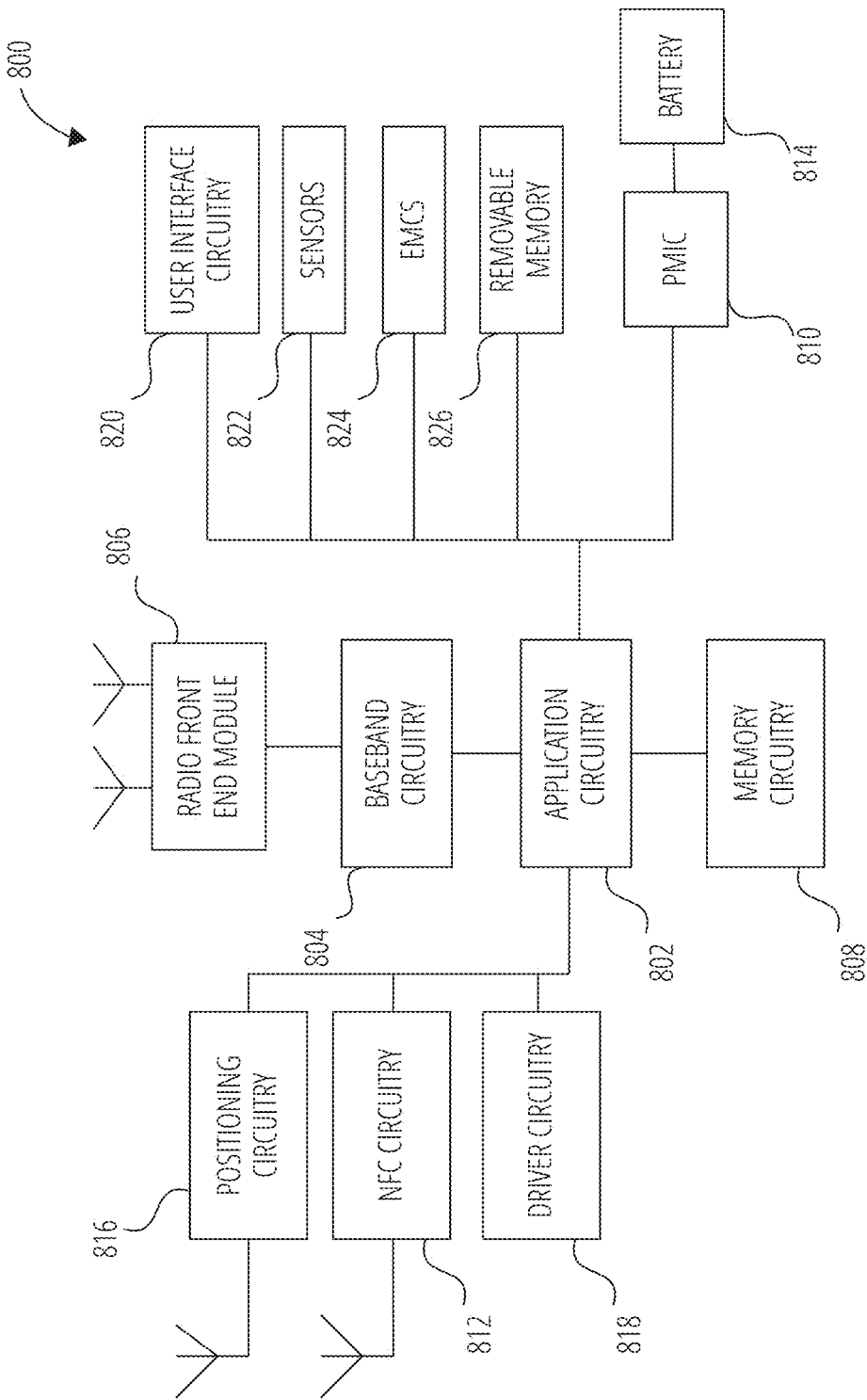
FIG. 8 illustrates a platform in accordance with some embodiments.

FIG. 8 illustrates an example of a platform 800 in accordance with various embodiments. In embodiments, the computer platform 800 may be suitable for use as UEs, application servers, and/or any other element/device discussed herein. The platform 800 may include any combinations of the components shown in the example. The components of platform 800 may be implemented as integrated circuits (ICs), portions thereof, discrete electronic devices, or other modules, logic, hardware, software, firmware, or a combination thereof adapted in the computer platform 800, or as components otherwise incorporated within a chassis of a larger system. The block diagram of FIG. 8 is intended to show a high level view of components of the computer platform 800. However, some of the components shown may be omitted, additional components may be present, and different arrangement of the components shown may occur in other implementations.

Application circuitry 802 includes circuitry such as, but not limited to one or more processors (or processor cores), cache memory, and one or more of LDOs, interrupt controllers, serial interfaces such as SPI, I$^2$C or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 802 may be coupled with or may include memory/storage elements and may be configured to execute instructions stored in the memory/storage to enable various applications or operating systems to run on the platform 800.

In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 802 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 802 may comprise, or may be, a special-purpose processor/controller to operate according to the various embodiments herein.

As examples, the processor(s) of application circuitry 802 may include an Intel® Architecture Core™ based processor, such as a Quark™, an Atom™, an i3, an i5, an i7, or an MCU-class processor, or another such processor available from Intel® Corporation. The processors of the application circuitry 802 may also be one or more of Advanced Micro Devices (AMD) Ryzen® processor(s) or Accelerated Processing Units (APUs); AS-A9 processor(s) from Apple® Inc., Snapdragon™ processor(s) from Qualcomm® Technologies, Inc., Texas Instruments, Inc.® Open Multimedia Applications Platform (OMAP)™ processor(s): a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 802 may be a part of a system on a chip (SoC) in which the application circuitry 802 and other components are formed into a single integrated circuit, or a single package, such as the Edison™ or Galileo™ SoC boards from Intel®, Corporation.

Additionally or alternatively, application circuitry 802 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 802 may comprise logic blocks or logic fabric, and other interconnected resources that may be programmed to perform various functions, such as the procedures, methods, functions, etc. of the various embodiments discussed herein. In such embodiments, the circuitry of application circuitry 802 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 804 may be implemented, for example, as a solder-down substrate including one or more integrated circuits, a single packaged integrated circuit soldered to a main circuit board or a multi-chip module containing two or more integrated circuits.

The radio front end module 806 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 806, which incorporates both mmWave antennas and sub-mmWave.

The memory circuitry 808 may include any number and type of memory devices used to provide for a given amount of system memory. As examples, the memory circuitry 808 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 808 may be developed in accordance with a Joint Electron Devices Engineering Council (JEDEC) low power double data rate (LPDDR)-based design, such as LPDDR2, LPDDR3, LPDDR4, or the like. Memory circuitry 808 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 808 maybe on-die memory or registers associated with the application circuitry 802. To provide for persistent storage of information such as data, applications, operating systems and so forth, memory circuitry 808 may include one or more mass storage devices, which may include, inter alia, a solid state disk drive (SSDD), hard disk drive (HDD), a microHDD, resistance change memories, phase change memories, holographic memories, or chemical memories, among others. For example, the computer platform 800 may incorporate the three-dimensional (3D) cross-point (XPOINT) memories from Intel® and Micron®.

The removable memory 826 may include devices, circuitry, enclosures/housings, ports or receptacles, etc. used to couple portable data storage devices with the platform 800. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 800 may also include interface circuitry (not shown) that is used to connect external devices with the platform 800. The external devices connected to the platform 800 via the interface circuitry include sensors 822 and electro-mechanical components (shown as EMCs 824), as well as removable memory devices coupled to removable memory 826.

The sensors 822 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 824 include devices, modules, or subsystems whose purpose is to enable platform 800 to change its state, position, and/or orientation, or move or control a mechanism or (sub)system. Additionally, EMCs 824 may be configured to generate and send messages/signaling to other components of the platform 800 to indicate a current state of the EMCs 824. Examples of the EMCs 824 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 800 is configured to operate one or more EMCs 824 based on one or more captured events and/or instructions or control signals received from a service provider and/or various clients. In some implementations, the interface circuitry may connect the platform 800 with positioning circuitry 816. The positioning circuitry 816 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 816 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 816 may include a Micro-PNT IC that uses a master timing clock to perform position tracking/estimation without GNSS assistance. The positioning circuitry 816 may also be part of, or interact with, the baseband circuitry 804 and/or radio front end module 806 to communicate with the nodes and components of the positioning network. The positioning circuitry 816 may also provide position data and/or time data to the application circuitry 802, which may use the data to synchronize operations with various infrastructure (e.g., radio base stations), for turn-by-turn navigation applications, or the like.

In some implementations, the interface circuitry may connect the platform 800 with Near-Field Communication circuitry (shown as NFC circuitry 812). The NFC circuitry 812 is configured to provide contactless, short-range communications based on radio frequency identification (RFID) standards, wherein magnetic field induction is used to enable communication between NFC circuitry 812 and NFC-enabled devices external to the platform 800 (e.g., an "NFC touchpoint"). NFC circuitry 812 comprises an NFC controller coupled with an antenna element and a processor coupled with the NFC controller. The NFC controller may be a chip/IC providing NFC functionalities to the NFC circuitry 812 by executing NFC controller firmware and an NFC stack The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 812, or initiate data transfer between the NFC circuitry 812 and another active NFC device (e.g., a smartphone or an NFC-enabled POS terminal) that is proximate to the platform 800.

The driver circuitry 818 may include software and hardware elements that operate to control particular devices that are embedded in the platform 800, attached to the platform 800, or otherwise communicatively coupled with the platform 800. The driver circuitry 818 may include individual drivers allowing other components of the platform 800 to interact with or control various input/output (I/O) devices that may be present within, or connected to, the platform 800. For example, driver circuitry 818 may include a display driver to control and allow access to a display device, a touchscreen driver to control and allow access to a touchscreen interface of the platform 800, sensor drivers to obtain sensor readings of sensors 822 and control and allow access to sensors 822, EMC drivers to obtain actuator positions of the EMCs 824 and/or control and allow access to the EMCs 824, a camera driver to control and allow access to an embedded image capture device, audio drivers to control and allow access to one or more audio devices.

The power management integrated circuitry (shown as PMIC 810) (also referred to as "power management circuitry") may manage power provided to various components of the platform 800. In particular, with respect to the baseband circuitry 804, the PMIC 810 may control power-source selection, voltage scaling, battery charging, or DC-to-DC conversion. The PMIC 810 may often be included when the platform 800 is capable of being powered by a battery 814, for example, when the device is included in a UE.

In some embodiments, the PMIC 810 may control, or otherwise be part of, various power saving mechanisms of the platform 800. For example, if the platform 800 is in an RRC_Connected state, where it is still connected to the RAN node as it expects to receive traffic shortly, then it may enter a state known as Discontinuous Reception Mode (DRX) after a period of inactivity. During this state, the platform 800 may power down for brief intervals of time and thus save power. If there is no data traffic activity for an extended period of time, then the platform 800 may transition off to an RRC_Idle state, where it disconnects from the network and does not perform operations such as channel quality feedback, handover, etc. The platform 800 goes into a very low power state and it performs paging where again it periodically wakes up to listen to the network and then powers down again. The platform 800 may not receive data in this state; in order to receive data, it must transition back to RRC_Connected state. An additional power saving mode may allow a device to be unavailable to the network for periods longer than a paging interval (ranging from seconds to a few hours).

During this time, the device is totally unreachable to the network and may power down completely. Any data sent during this time incurs a large delay and it is assumed the delay is acceptable.

A battery 814 may power the platform 800, although in some examples the platform 800 may be mounted deployed in a fixed location, and may have a power supply coupled to an electrical grid. The battery 814 may be a lithium ion battery, a metal-air battery, such as a zinc-air battery, an aluminum-air battery, a lithium-air battery, and the like. In some implementations, such as in V2X applications, the battery 814 may be a typical lead-acid automotive battery.

In some implementations, the battery 814 may be a "smart battery," which includes or is coupled with a Battery Management System (BMS) or battery monitoring integrated circuitry. The BMS may be included in the platform 800 to track the state of charge (SoCh) of the battery 814. The BMS may be used to monitor other parameters of the battery 814 to provide failure predictions, such as the state of health (SoH) and the state of function (SoF) of the battery 814. The BMS may communicate the information of the battery 814 to the application circuitry 802 or other components of the platform 800. The BMS may also include an analog-to-digital (ADC) convertor that allows the application circuitry 802 to directly monitor the voltage of the battery 814 or the current flow from the battery 814. The battery parameters may be used to determine actions that the platform 800 may perform, such as transmission frequency, network operation, sensing frequency, and the like.

A power block, or other power supply coupled to an electrical grid may be coupled with the BMS to charge the battery 814. In some examples, the power block may be replaced with a wireless power receiver to obtain the power wirelessly, for example, through a loop antenna in the computer platform 800. In these examples, a wireless battery charging circuit may be included in the BMS. The specific charging circuits chosen may depend on the size of the battery 814, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 820 includes various input/output (I/O) devices present within, or connected to, the platform 800, and includes one or more user interfaces designed to enable user interaction with the platform 800 and/or peripheral component interfaces designed to enable peripheral component interaction with the platform 800. The user interface circuitry 820 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 800. The output device circuitry may also include speakers or other audio emitting devices, printer(s), and/or the like. In some embodiments, the sensors 822 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 800 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 9:
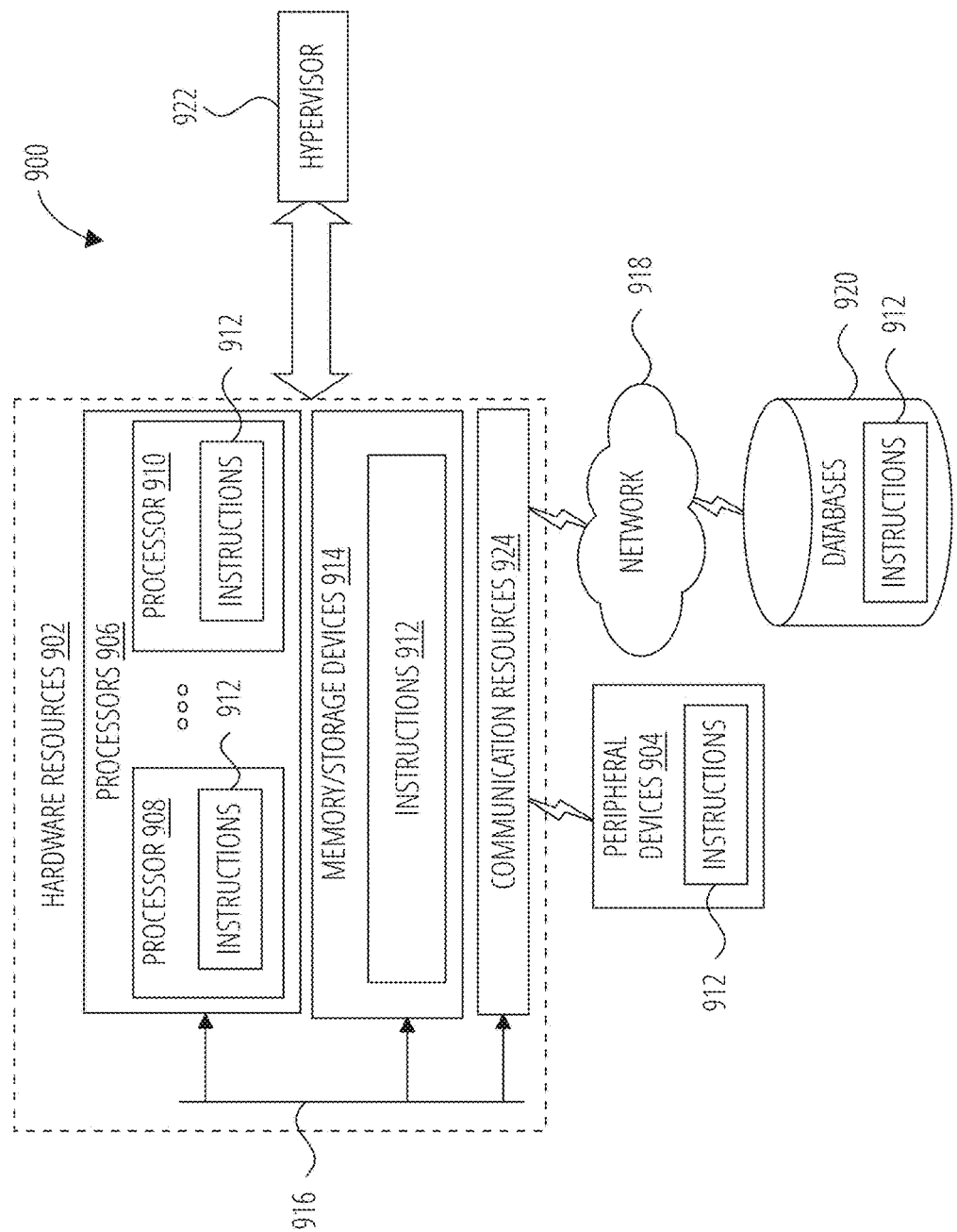
FIG. 9 illustrates system components in accordance with some embodiments.

FIG. 9 is a block diagram illustrating components 900, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 902 including one or more processors 906 (or processor cores), one or more memory/storage devices 914, and one or more communication resources 924, each of which may be communicatively coupled via a bus 916. For embodiments where node virtualization (e.g., NFV) is utilized, a hypervisor 922 may be executed to provide an execution environment for one or more network slices/sub-slices to utilize the hardware resources 902.

The processors 906 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 908 and a processor 910.

The memory/storage devices 914 may include main memory, disk storage, or any suitable combination thereof. The memory/storage devices 914 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 924 may include interconnection or network interface components or other suitable devices to communicate with one or more peripheral devices 904 or one or more databases 920 via a network 918. For example, the communication resources 924 may include wired communication components (e.g., for coupling via a Universal Serial Bus (USB)), cellular communication components, NFC components, Bluetooth® components (e.g., Bluetooth® Low Energy), Wi-Fi (k components, and other communication components.

Instructions 912 may comprise software, a program, an application, an applet, an app, or other executable code for causing at least any of the processors 906 to perform any one or more of the methodologies discussed herein. The instructions 912 may reside, completely or partially, within at least one of the processors 906 (e.g., within the processor's cache memory), the memory/storage devices 914, or any suitable combination thereof. Furthermore, any portion of the instructions 912 may be transferred to the hardware resources 902 from any combination of the peripheral devices 904 or the databases 920. Accordingly, the memory of the processors 906, the memory/storage devices 914, the peripheral devices 904, and the databases 920 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1 may include a method for determining physical downlink shared channel (PDSCH) hybrid automatic repeat request-acknowledgement (HARQ-ACK) processing timing. The method may comprise determining that a user equipment (UE) is configured for single downlink control information (single-DCI) multiple transmission and reception point (multi-TRP) PDSCH operation, determining a first PDSCH and a second PDSCH within a slot, wherein the first PDSCH and the second PDSCH are used in the single-DCI multi-TRP PDSCH operation, and determining a minimum HARQ-ACK processing timing for the first PDSCH and the second PDSCH using one or more symbols of the first PDSCH or one or more symbols of both the first PDSCH and the second PDSCH.

Example 2 may include the method of Example 1, wherein the single-DCI multi-TRP PDSCH operation is a TDMSchemeA operation.

Example 3 may include the method of Example 1, wherein the first PDSCH and the second PDSCH have the same duration.

Example 4 may include the method of Example 3, wherein the first PDSCH and the second PDSCH have the same frequency resource allocation.

Example 5 may include the method of Example 1, wherein the determining of the minimum HARQ-ACK processing timing for the first PDSCH and the second PDSCH only uses the one or more symbols of the first PDSCH.

Example 6 may include the method of Example 1, wherein the determining of the minimum HARQ-ACK processing timing for the first PDSCH and the second PDSCH uses the one or more symbols of both the first PDSCH and the second PDSCH and one or more blank symbols located between the first PDSCH and the second PDSCH.

Example 7 may include the method of Example 1, wherein the determining of the minimum HARQ-ACK processing timing for the first PDSCH and the second PDSCH uses the one or more symbols of both the first PDSCH and the second PDSCH, and does not use any blank symbols located between the first PDSCH and the second PDSCH.

Example 8 may include the method of Example 1, wherein the determining of the minimum HARQ-ACK processing timing for the first PDSCH and the second PDSCH is determining an overall HARQ-ACK processing timing, and further comprises determining an initial minimum HARQ-ACK processing timing of the first PDSCH ($k1\_1$), determining an initial minimum HARQ-ACK processing timing of the second PDSCH ($k1\_2$), and determining the overall HARQ-ACK processing timing ($K_1$) using the first minimum HARQ-ACK processing timing and the second minimum HARQ-ACK processing timing.

Example 9 may include the method of Example 8, wherein the overall HARQ-ACK processing timing ($K_1$) is equal to $\max(k1\_1-\text{Offset}, 0)+k1\_2+C$, wherein the Offset value is an offset between a last symbol of the first PDSCH and a first symbol of the second PDSCH, and the C value is a constant.

Example 10 may include the method of Example 8, wherein the overall HARQ-ACK processing timing ($K_1$) is equal to $\max(k1\_1, k1\_2)+C$, wherein the C value is a constant.

Example 11 may include the method of Example 8, wherein the overall HARQ-ACK processing timing ($K_1$) is equal to $k1\_1+k1\_2+C$, wherein the C value is a constant.

Example 12 may include a non-transitory computer-readable storage medium, the computer-readable storage medium including instructions that when executed by a processor, cause the processor to determine that a user equipment (UE) is configured for single downlink control information (single-DCI) multiple transmission and reception (multi-TRP) PDSCH operation, determine a first PDSCH and a second PDSCH with a slot, wherein the first PDSCH and the second PDSCH are used in the single-DCI multi-TRP PDSCH operation, and determine a minimum hybrid automatic repeat request-acknowledgement (HARQ-ACK) processing timing for the first PDSCH and the second PDSCH using one or more symbols of the first PDSCH or one or more symbols of both the first PDSCH and the second PDSCH.

Example 13 may include the non-transitory computer-readable storage medium of Example 12, wherein the determining of the minimum HARQ-ACK processing timing for the first PDSCH and the second PDSCH is determining an overall HARQ-ACK processing timing, and the instructions, when executed by the processor, further cause the processor to determine an initial minimum HARQ-ACK processing timing of the first PDSCH (k1_1), determine an initial minimum HARQ-ACK processing timing of the second PDSCH (k1_2), and determine the overall HARQ-ACK processing timing ($K_1$) using the first minimum HARQ-ACK processing timing and the second minimum HARQ-ACK processing timing.

Example 14 may include the non-transitory computer-readable storage medium of Example 13, wherein the overall HARQ-ACK processing timing ($K_1$) is equal to max(k1_1−Offset, 0)+k1_2+C, wherein the Offset value is an offset between a last symbol of the first PDSCH and a first symbol of the second PDSCH, and the C value is a constant.

Example 15 may include the non-transitory computer-readable storage medium of Example 13, wherein the overall HARQ-ACK processing timing ($K_1$) is equal to max(k1_1, k1_2)+C, wherein the C value is a constant.

Example 16 may include the non-transitory computer-readable storage medium of Example 13, wherein the overall HARQ-ACK processing timing ($K_1$) is equal to k1_1+k1_2+C, wherein the C value is a constant.

Example 17 may include computing apparatus for determining physical downlink shared channel (PDSCH) hybrid automatic repeat request-acknowledgement (HARQ-ACK) processing timing, the computing apparatus comprising a processor and a memory storing instructions that, when executed by the processor, configure the apparatus to determine that a user equipment (UE) is configured for single downlink control information (single-DCI) multiple transmission and reception (multi-TRP) PDSCH operation, determine a first PDSCH and a second PDSCH within a slot, wherein the first PDSCH and the second PDSCH are used in the single-DCI multi-TRP PDSCH operation, and determine a minimum HARQ-ACK processing timing for the first PDSCH and the second PDSCH using one or more symbols of the first PDSCH or one or more symbols of both the first PDSCH and the second PDSCH.

Example 18 may include the computing apparatus of Example 17, wherein the determining of the minimum HARQ-ACK processing timing for the first PDSCH and the second PDSCH is determining an overall HARQ-ACK processing timing, and wherein the instructions, when executed by the processor, further configure the apparatus to determine an initial minimum HARQ-ACK processing timing of the first PDSCH (k1_1), determine an initial minimum HARQ-ACK processing timing of the second PDSCH (k1_2), and determine the overall HARQ-ACK processing timing ($K_1$) using the first minimum HARQ-ACK processing timing and the second minimum HARQ-ACK processing timing.

Example 19 may include the computing apparatus of Example 18, wherein the overall HARQ-ACK processing timing ($K_1$) is equal to max(k1_1−Offset, 0)+k1_2+C, wherein the Offset value is an offset between a last symbol of the first PDSCH and a first symbol of the second PDSCH, and the C value is a constant.

Example 20 may include the computing apparatus of Example 18, wherein the overall HARQ-ACK processing timing ($K_1$) is equal to max(k1_1, k1_2)+C, wherein the C value is a constant.

Example 21 may include the computing apparatus of Example 18, wherein the overall HARQ-ACK processing timing ($K_1$) is equal to k1_1+k1_2+C, wherein the C value is a constant.

Example 22 may include a method for user equipment (UE) capability reporting, comprising determining a UE configuration for one or both of multiple downlink control information (multi-DCI) multiple transmission and reception (multi-TRP) operation and single-DCI multi-TRP operation, determining a physical downlink shared channel (PDSCH) processing capability for a timing offset between a PDSCH and a HARQ-ACK for the one or both of the multi-DCI multi-TRP operation and the single-DCI multi TRP operation, determining a physical uplink shared channel (PUSCH) processing capability for a timing offset between a physical downlink control channel (PDCCH) and a PUSCH for one or both of the multi-DCI multi-TRP operation and the single-DCI multi TRP operation, and generating one or more reports indicating support for the determined PDSCH processing capability and the determined PUSCH processing capability.

Example 23 may include the method of Example 22, wherein the one or more reports are transmitted by the UE on a per feature set per component carrier basis.

Example 24 may include the method of Example 22, wherein the determined UE configuration is for multi-DCI multi-TRP, and the determined PDSCH processing capability is not PDSCH processing capability 2, wherein the PDSCH processing capability 2 uses a low latency HARQ-ACK feedback.

Example 25 may include the method of Example 22, wherein the determined UE configuration is for single-DCI multi-TRP, and the determined PDSCH processing capability is not PDSCH processing capability 2, wherein the PDSCH processing capability 2 uses a low latency HARQ-ACK feedback.

Example 26 may include the method of Example 22, wherein the determined UE configuration is for multi-DCI multi-TRP, and the determined PUSCH processing capability is not PUSCH processing capability 2, wherein the PUSCH processing capability 2 uses a low latency PUSCH processing.

Example 27 may include an apparatus comprising means to perform one or more elements of a method described in or related to any of the above Examples, or any other method or process described herein.

Example 28 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 29 may include an apparatus comprising logic, modules, or circuitry to perform one or more elements of a method described in or related to any of the above Examples, or any other method or process described herein.

Example 30 may include a method, technique, or process as described in or related to any of the above Examples, or portions or parts thereof.

Example 31 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 32 may include a signal as described in or related to any of the above Examples, or portions or parts thereof.

Example 33 may include a datagram, packet, frame, segment, protocol data unit (PDU), or message as described in or related to any of the above Examples, or portions or parts thereof, or otherwise described in the present disclosure.

Example 34 may include a signal encoded with data as described in or related to any of the above Examples, or portions or parts thereof, or otherwise described in the present disclosure.

Example 35 may include a signal encoded with a datagram, packet, frame, segment, PDU, or message as described in or related to any of the above Examples, or portions or parts thereof, or otherwise described in the present disclosure.

Example 36 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 37 may include a computer program comprising instructions, wherein execution of the program by a processing element is to cause the processing element to carry out the method, techniques, or process as described in or related to any of the above Examples, or portions thereof.

Example 38 may include a signal in a wireless network as shown and described herein.

Example 39 may include a method of communicating in a wireless network as shown and described herein.

Example 40 may include a system for providing wireless communication as shown and described herein.

Example 41 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for determining physical downlink shared channel (PDSCH) hybrid automatic repeat request-acknowledgement (HARQ-ACK) processing timing, comprising:
   determining that a user equipment (UE) is configured for single downlink control information (single-DCI) multiple transmission and reception point (multi-TRP) PDSCH operation;
   determining a first PDSCH and a second PDSCH within a slot, wherein the first PDSCH and the second PDSCH are used in the single-DCI multi-TRP PDSCH operation; and
   determining an overall minimum HARQ-ACK processing timing for both the first PDSCH and the second PDSCH using one or more symbols of the first PDSCH or one or more symbols of both the first PDSCH and the second PDSCH.

2. The method of claim 1, wherein the single-DCI multi-TRP PDSCH operation is a TDMSchemeA operation.

3. The method of claim 1, wherein the first PDSCH and the second PDSCH have a same duration.

4. The method of claim 3, wherein the first PDSCH and the second PDSCH have a same frequency resource allocation.

5. The method of claim 1, wherein the determining of the overall minimum HARQ-ACK processing timing for both the first PDSCH and the second PDSCH only uses the one or more symbols of the first PDSCH.

6. The method of claim 1, wherein the determining of the overall minimum HARQ-ACK processing timing for both the first PDSCH and the second PDSCH uses the one or more symbols of both the first PDSCH and the second PDSCH and one or more blank symbols located between the first PDSCH and the second PDSCH.

7. The method of claim 1, wherein the determining of the overall minimum HARQ-ACK processing timing for both the first PDSCH and the second PDSCH uses the one or more symbols of both the first PDSCH and the second PDSCH, and does not use any blank symbols located between the first PDSCH and the second PDSCH.

8. The method of claim 1, wherein the determining of the overall minimum HARQ-ACK processing timing for both the first PDSCH and the second PDSCH comprises:
determining an initial minimum HARQ-ACK processing timing of the first PDSCH (k1_1);
determining an initial minimum HARQ-ACK processing timing of the second PDSCH (k1_2); and
determining the overall HARQ-ACK processing timing ($K_1$) using the initial minimum HARQ-ACK processing timing of the first PDSCH (k1_1) and the initial minimum HARQ-ACK processing timing of the second PDSCH (k1_2).

9. The method of claim 8, wherein the overall HARQ-ACK processing timing ($K_1$) is equal to
max(k1_1−Offset, 0)+k1_2+C, wherein the Offset value is an offset between a last symbol of the first PDSCH and a first symbol of the second PDSCH, and the C value is a constant.

10. The method of claim 8, wherein the overall HARQ-ACK processing timing ($K_1$) is equal to max(k1_1, k1_2)+C, wherein the C value is a constant.

11. The method of claim 8, wherein the overall HARQ-ACK processing timing ($K_1$) is equal to
k1_1+k1_2+C, wherein the C value is a constant.

12. A non-transitory computer-readable storage medium, the computer-readable storage medium including instructions that when executed by a processor, cause the processor to:
determine that a user equipment (UE) is configured for single downlink control infoiniation (single-DCI) multiple transmission and reception (multi-TRP) PDSCH operation;
determine a first PDSCH and a second PDSCH with a slot, wherein the first PDSCH and the second PDSCH are used in the single-DCI multi-TRP PDSCH operation; and
determine an overall minimum hybrid automatic repeat request-acknowledgement (HARQ-ACK) processing timing for both the first PDSCH and the second PDSCH using one or more symbols of the first PDSCH or one or more symbols of both the first PDSCH and the second PDSCH.

13. The non-transitory computer-readable storage medium of claim 12, wherein the determining of the overall minimum HARQ-ACK processing timing for both the first PDSCH and the second PDSCH is deteiniining an overall HARQ-ACK processing timing, and the instructions, when executed by the processor, further cause the processor to:
determinine an initial minimum HARQ-ACK processing timing of the first PDSCH (k1_1);
determinine an initial minimum HARQ-ACK processing timing of the second PDSCH (k1_2); and
determinine the overall HARQ-ACK processing timing ($K_1$) using the initial minimum HARQ-ACK processing timing of the first PDSCH (k1_1) and the initial minimum HARQ-ACK processing timing of the second PDSCH (k1_2).

14. The non-transitory computer-readable storage medium of claim 13, wherein the overall HARQ-ACK processing timing ($K_1$) is equal to max(k1_1−Offset, 0)+k1_2+C, wherein the Offset value is an offset between a last symbol of the first PDSCH and a first symbol of the second PDSCH, and the C value is a constant.

15. The non-transitory computer-readable storage medium of claim 13, wherein the overall HARQ-ACK processing timing ($K_1$) is equal to max(k1_1, k1_2)+C, wherein the C value is a constant.

16. The non-transitory computer-readable storage medium of claim 13, wherein the overall HARQ-ACK processing timing ($K_1$) is equal to k1_1+k1_2+C, wherein the C value is a constant.

17. A computing apparatus for deteimining physical downlink shared channel (PDSCH) hybrid automatic repeat request-acknowledgement (HARQ-ACK) processing timing, the computing apparatus comprising:
a processor; and
a memory storing instructions that, when executed by the processor, configure the apparatus to:
determine that a user equipment (UE) is configured for single downlink control infoiniation (single-DCI) multiple transmission and reception (multi-TRP) PDSCH operation; determine a first PDSCH and a second PDSCH within a slot, wherein the first PDSCH and the second PDSCH are used in the single-DCI multi-TRP PDSCH operation; and
determine an overall minimum HARQ-ACK processing timing for both the first PDSCH and the second PDSCH using one or more symbols of the first PDSCH or one or more symbols of both the first PDSCH and the second PDSCH.

18. The computing apparatus of claim 17, wherein the determining of the overall minimum HARQ-ACK processing timing for both the first PDSCH and the second PDSCH is determining an overall HARQ-ACK processing timing, and wherein the instructions, when executed by the processor, further configure the apparatus to:
determine an initial minimum HARQ-ACK processing timing of the first PDSCH (k1_1);
determine an initial minimum HARQ-ACK processing timing of the second PDSCH (k1_2); and
determinine the overall HARQ-ACK processing timing ($K_1$) using the initial minimum HARQ-ACK processing timing of the first PDSCH (k1_1) first and the initial minimum HARQ-ACK processing timing of the second PDSCH (k1_2).

19. The computing apparatus of claim 18, wherein the overall HARQ-ACK processing timing ($K_1$) is equal to max(k1_1−Offset, 0)+k1_2+C, wherein the Offset value is an offset between a last symbol of the first PDSCH and a first symbol of the second PDSCH, and the C value is a constant.

20. The computing apparatus of claim 18, wherein the overall HARQ-ACK processing timing ($K_1$) is equal to max(k1_1, k1_2)+C, wherein the C value is a constant.

* * * * *